United States Patent
Dosovitsky et al.

(10) Patent No.: US 9,866,489 B2
(45) Date of Patent: Jan. 9, 2018

(54) DELAYED PROXY ACTION

(71) Applicant: F5 Networks, Inc., Seattle, WA (US)

(72) Inventors: Gennady Dosovitsky, Sunnyvale, CA (US); Dmitry Rovniaguin, Sunnyvale, CA (US); Sumandra Majee, San Jose, CA (US); Ron Talmor, Sunnyvale, CA (US)

(73) Assignee: F5 Networks, Inc., Seattle, WA (US)

( * ) Notice: Subject to any disclaimer, the term of this patent is extended or adjusted under 35 U.S.C. 154(b) by 102 days.

(21) Appl. No.: 14/329,743

(22) Filed: Jul. 11, 2014

(65) Prior Publication Data

US 2016/0014033 A1   Jan. 14, 2016

(51) Int. Cl.
*H04L 12/813*   (2013.01)
*H04L 12/721*   (2013.01)

(52) U.S. Cl.
CPC .............. *H04L 47/20* (2013.01); *H04L 45/38* (2013.01)

(58) Field of Classification Search
CPC ..... H04L 12/42; H04L 12/56; H04L 12/5692; H04L 45/00; H04L 45/26; H04L 45/38; H04L 45/507; H04L 47/20
See application file for complete search history.

(56) References Cited

U.S. PATENT DOCUMENTS

| | | | |
|---|---|---|---|
| 6,535,484 B1 * | 3/2003 | Hughes | H04L 12/5601 370/230 |
| 6,718,326 B2 * | 4/2004 | Uga | H04L 45/00 |
| 6,760,303 B1 * | 7/2004 | Brouwer | H04W 36/06 370/229 |
| 6,778,495 B1 * | 8/2004 | Blair | H04L 45/245 370/230 |
| 7,843,843 B1 | 11/2010 | Papp, III et al. | |
| 8,560,693 B1 | 10/2013 | Wang et al. | |

(Continued)

FOREIGN PATENT DOCUMENTS

EP   2465322 B1   6/2012

OTHER PUBLICATIONS

International Search Report and Written Opinion for International Application No. PCT/US2015/039328, dated Oct. 27, 2015, 11 pages.

*Primary Examiner* — Benjamin H Elliott, IV
*Assistant Examiner* — Prince A Mensah
(74) *Attorney, Agent, or Firm* — John W. Branch; Lowe Graham Jones PLLC

(57) ABSTRACT

Embodiments are directed towards managing communication over a network with a packet traffic management device that performs delayed proxy action. The PTMD includes a buffer for buffering network traffic. Also, the PTMD includes proxy data paths and standard data paths. Network policies associated with the network flows may be determined using the buffered data. If a determined network policy includes proxy policy rules it is a proxy network policy. Then the network flows are associated with a proxy data path. If the buffer is exhausted, the network flow is associated with a standard data path before a policy is determined. Otherwise, if the network policy includes only standard policy rules, the network flows are moved to a standard data path. After the network flow is associated with a data path, the network traffic may be communicated until it is closed or otherwise terminated.

24 Claims, 9 Drawing Sheets

(56) References Cited

U.S. PATENT DOCUMENTS

| | | | |
|---|---|---|---|
| 2003/0163593 A1* | 8/2003 | Knightly | H04L 12/42 709/251 |
| 2003/0210653 A1 | 11/2003 | Pan | |
| 2004/0032869 A1* | 2/2004 | Ambe | H04L 45/26 370/392 |
| 2005/0207411 A1* | 9/2005 | Ota | H04L 12/2856 370/389 |
| 2006/0120286 A1* | 6/2006 | Fan | H04L 12/5602 370/230.1 |
| 2007/0153803 A1* | 7/2007 | Lakshmanamurthy | H04L 12/5693 370/395.43 |
| 2009/0003212 A1 | 1/2009 | Kwan et al. | |
| 2009/0185558 A1* | 7/2009 | Yeom | H04L 12/5692 370/352 |
| 2010/0142369 A1* | 6/2010 | Gottwerth | H04L 12/56 370/225 |
| 2015/0288593 A1* | 10/2015 | Campbell | H04L 43/16 709/224 |

\* cited by examiner

US 9,866,489 B2

DELAYED PROXY ACTION

TECHNICAL FIELD

The present invention relates generally to network traffic management and, more particularly, but not exclusively to methods for determining policies for network traffic management.

BACKGROUND

As businesses and people become more and more dependent on the availability of ubiquitous networks and network services, network traffic management system have an increased responsibility for the safe, secure, and efficient allocation of network resources. Further, not only are network services becoming more available they are becoming more varied. Accordingly, network traffic management systems are often responsible for supporting many different types of network services and/or applications that are being utilized by many different types of users. In some cases, network traffic flows related to different applications and/or users may be processed under different network traffic management policies. Accordingly, network traffic management systems are often tasked with, efficiently determining the management policy that should be applied to a given network flow. Thus, it is with respect to these considerations and others that the invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Description of Various Embodiments, which is to be read in association with the accompanying drawings, wherein.

DETAILED DESCRIPTION OF VARIOUS EMBODIMENTS

Figure 1:
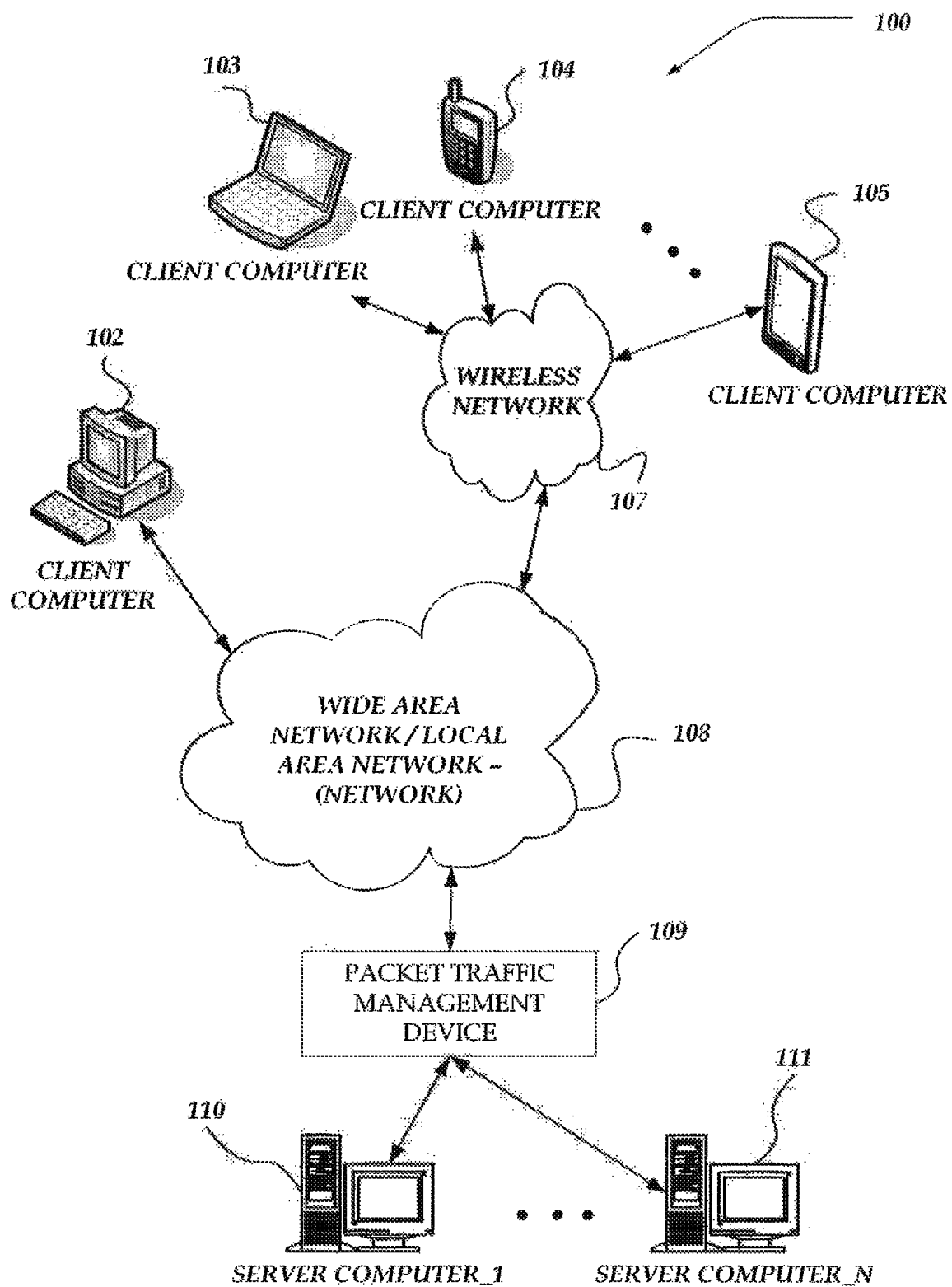
FIG. 1 is a system diagram of an environment in which embodiments of the invention may be implemented.

The present innovations now will be described more fully hereinafter with reference to the accompanying drawings, which form a part hereof, and which show, by way of illustration, specific embodiments by which the invention may be practiced. These innovations may, however, be embodied in many different forms and should not be construed as limited to the embodiments set forth herein; rather, these embodiments are provided so that this disclosure will be thorough, and complete, and will fully convey the scope of the invention to those skilled in the art. Among other things, the present innovations may be embodied as methods, computers, or devices. Accordingly, the present innovations may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one of die embodiments" or "in at least one of the various embodiments" as used herein does not necessarily refer to the same embodiment, though it may. Furthermore, the phrase "in another embodiment" as used herein does not necessarily refer to a different embodiment, although it may. Thus, as described below, various embodiments of the innovations may be readily combined, without departing from the scope or spirit of the innovations.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "air" and "the" include plural references. The meaning of "in" includes "in" and "on."

As used herein, the term "tuple" refers to a set of values that identify a source and destination of a connection. In one embodiment, a 5 tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. In at least one of the various embodiments, source port numbers may be a TCP source port number. Likewise, in at least one of the various embodiments, destination port number may be a TCP destination port number. In at least one of the various embodiments, tuples may be used to identify network flows (e.g., connection flows). However, a tuple need not be a 5 tuple, and other combinations of the above may also be used. For example, a tuple may be a four-tuple, using a source IP address, a destination IP address, a source port number, and a destination port number. Other combinations are also considered. Moreover, as used herein, a "flow key" refers to key that may be generated based on a tuple comprising any combination of fields selected from within a network packet header, including those fields identified above.

As used herein, the terms "network flow." "connection flow,", "flow" may refer to a network session established between two endpoints. In at least one of the various embodiments, a tuple may describe the flow. In at least one of the various embodiments, flow control data associated with connection flows may be used to ensure that the network packets sent between the endpoints of a connection flow may be routed along the same path. In at least one of the various embodiments, the performance of connection oriented network protocols such as TCP/IP may be impaired if network packets may be routed using varying paths and/or directed different endpoints. Further, one or more protocol, options may be associated with a flow enabling the endpoints to employ one or more features of the protocol that may be otherwise optional.

As used herein the terms "network destination," or "network address" refer to a name or number used to identify one or more items, objects, services, and/or locations in a communication network. In some cases, the network destination and/or network address may represent a single unique endpoint on the network. In other cases, the network destination and/or network address may represent of one or more endpoints each sharing one or more similar network communication attributes and/or characteristics. In at least one of the various embodiments, the elements that comprise tuples may be considered network destinations and/or components of a network destination. Also, network destinations may be defined using one or more sub-networking masks, wildcards, matching patterns, or the like. Network communication/monitoring/metrics may be directed to one or more network destinations.

As used herein the term "network traffic" refers to data and/or information that is communicated over a network flow. This information may be arranged according to the underlying network technology (e.g., Ethernet, Token Ring, ATM, or the like). Also, the information may be further arranged based on the network protocols (e.g., Transmission Control Protocol (TCP), User Datagram Protocol (UDP), Secure Shell (SSH), File Transfer Protocol (FTP), or the like) that are being used. Network traffic is often described in terms of packets, bytes, frames, streams, channels, or the like, depending on the applications and protocols being employed.

As used herein the terms "proxy," or "proxying" refers to a class of actions performed to enable the PTMD to act as an intermediary (e.g., as a proxy server) between client computers and server computers. The PTMD may act as an endpoint for the connection with client computer and create a new connection to a server computer. Accordingly, as an intermediary between the client computer and the server computer, the PTMD is enabled enforce one or more policies, including, at least those policies that require complex redirection, code insertion, or the like. In at least one of the various embodiments, the PTMD may be arranged to perform one or more different types of proxying, such as, forward proxying, reverse proxying, or the like.

As used herein the term "policy rule" refers to conditions and actions that may be paired together such that if a condition is met then the corresponding action may be executed, in at least one of the various embodiments, conditions may be compound conditions comprised of multiple conditions. In at least one of the various embodiments, actions may also be compound actions, or in other words, multiple actions may be associated with a condition and/or a policy rule. Policy rules may be arranged perform various network traffic management actions on network traffic, such as, load balancing, network flow steering, firewalling, modifying traffic data, enforcing security, caching, compression, decompression, cryptographic operations, proxying, traffic routing, traffic switching, bandwidth shaping, quota tracking, or the like.

As used herein the term "policy" refers to a plurality of policy rules grouped together based on reasons, such as, semantic similarity, domain similarity, or the like. In at least one of the various embodiments, policy rules may be grouped into policies for any arbitrary reason to support the network management goals of a user/administrator of a traffic management device.

As used herein the term "policy engine" refers to a component of traffic management device that is arranged to process policy rules. In at least one of the various embodiments, a policy engine may be arranged to execute policy rules that are expressed in one or more computer programming languages, scripts, macros, configuration settings, or the like. Thus, in at least one of the various embodiments, expressions related to conditions and actions may execute by a policy engine.

As used herein the term "proxy policy" refers to policies that are arranged to include policy rules that may include actions that require a proxying seep to be performed to enforce the policy. For example, a proxy policy may include a policy rule for load balancing that may require reverse proxying of the network traffic for a server computer.

As used herein the term "proxy policy rule" refers to a policy rule that is arranged to perform actions such as, complex redirecting of network traffic using proxying, or the like. In at least one of the various embodiments, proxy policy rules may include enforcement actions that proxy network traffic by using Open Systems Interconnection (OSI) model layer 7 information in a network flow.

As used herein the term "standard policy" refers to policies that are arranged to include policy rules that do not require intervention. For example, standard policy rules may include iron-proxying rules, such as, bandwidth monitoring, usage monitoring, simple firewall rules, bump-on-the wire compression/decompression, bump-on-the-wire cryptographic operations, or the like. In at least one of the various embodiments, standard policies may be arranged for dropping traffic, pass through of traffic, or simple redirects.

As used herein the term "standard policy rule" refers to a policy rule that is arranged to perform actions such as, simple redirecting of network traffic, code insertion, complex filtering, proxying, or the like, that do not require proxying of the network traffic. In at least one of the various embodiments, standard policy rules may include conditions and/or actions that may rely on OSI model layer 4 information in a network flow. For example, standard policy rules may include non-proxying rules, such as, bandwidth monitoring, usage monitoring, simple firewall rules, bump-on-the-wire compression/decompression, bump-on-the-wire cryptographic operations, or the like.

As used herein the term "bump-on-the-wire" refers to network management operations that are arranged to execute in-line with a network flow rather than requiring a network flow to be terminated or otherwise proxied to perform the operation. These operations may be transparent to other devices on the network, such as, routers and switches.

As used herein the term "data path" refers to a physical and/or logical path through a network traffic management device for processing/routing network traffic. Network traffic associated with a network flow may be assigned to a particular data path based on one or more policies. Data paths may be optimized according the policies for tire network flows they may be processing.

As used herein the term "proxy data path" refers to a data path that enables the traffic management device to process network flows that are managed under a proxy policy. Accordingly a proxy data path may be arranged to include connection mapping tables, or the like.

As used herein the term "standard data path" refers to data path that is optimized for processing network flows that have been determined to be subject to standard policy rules. A standard data path is arranged to support bump-on-the-wire actions. Accordingly, the standard data path may be enabled to facilitate non-proxied actions and/or policies, such as, monitoring, packet dropping, simple redirection (e.g., HTTP redirection), simple firewall rules, bump-on-the-wire compression/decompression, bump-on-the-wire cryptographic operations, or the like.

As used herein the term "subscriber" refers to a user, person, or other entity that is associated with a one or more network flows that may be requesting access to applications or services that are under management by a network traffic management server. In some cases, information sufficient for identifying the subscriber may be included directly in the network traffic. In other cases, such information may be provided by external sources. Likewise, additional information associated with a subscriber may be stored locally on a network traffic manager or provided by one or more external sources upon request. Further, in some embodiments, subscribers may be associated with a mobile computer, such as, a smart phone, tablet computer, or the like. Also, in some cases, subscribers may be associated with various computers, such as, network computers, client computers, smart televisions, set-top boxes, games consoles, or the like, or combination thereof in some embodiments, subscribers may be associated with one or more policies, such as, standard policies, proxy policies. Accordingly, in at least one of the various embodiments, if subscriber information is available, a policy may sometimes be determined based on the one or more policies that may be associated with the subscriber.

The following briefly describes the various embodiments to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards managing communication over a network with a packet traffic management device (PTMD) that may be arranged to perform delayed proxy actions. In at least one of the various embodiments, the PTMD may be arranged to include a buffer for buffering network traffic from one or more network flows. Also, the PTMD may be arranged to include one or more proxy data paths and one or more standard data paths for processing the network traffic. In at least one of the various embodiments, one or more network policies associated with the network flows may be determined based on the buffered data.

In at least one of the various embodiments, if a determined network policy includes one or more proxy policy rules the network policy may be considered a proxy network policy. Accordingly, in at least one of the various embodiments, the network flows may be assigned or associated with a proxy data path on the PTMD. In at least one of the various embodiments, proxy policy rules may comprise actions such as generating another network, flow for a connection the PTMD to a server computer such that the network traffic from the original network flow may be communicated to the server computer over the other network flow (e.g., proxy services). In at least one of the various embodiments, if the amount of buffered network traffic exceeds a defined buffer size limit, the network flow may be moved to a standard data path before the policy may be determined.

Otherwise, in at least one of the various embodiments, if the determined network policy includes only standard policy rules, network flows may be moved to a standard data path. Moreover, in at least one of the various embodiments, standard policy rules may further comprise one or more actions such as, bandwidth monitoring, usage monitoring, firewall rules, bump-on-the-wire compression, bump-on-the-wire decompression, bump-on-the-wire cryptographic operations, or the like.

In at least one of the various embodiments, the network polices and/or the data path for a network flow may be determined based on information associated with a subscriber that is associated with the network flow. Also, In at least one of the various embodiments, determining which data path to employ may be a configuration value that may be associated with the at least one network policy such that the configuration value may indicate which of the data paths, a proxy data path or a standard data path, should be associated with the network policy.

In at least one of the various embodiments, if the network flow has been moved to a data path in the PTMD, the network traffic may be communicated over the network flow until it is closed or otherwise terminated.

Illustrative Operating Environment

FIG. 1 shows components of one embodiment of an environment in which the invention may be practiced. Not all of the components may be required to practice these innovations, and variations in the arrangement and type of the components may be made without departing from the spirit or scope of the invention.

As shown, system 100 of FIG. 1 includes local area networks ("LANs")/wide area networks ("WANs")—(network) 108, wireless network 107, client computers 102-105, packet traffic management device ("PTMD") 109, and server computers 110-111. Network 108 is in communication with and enables communication between client computers 102-105, wireless network 107, and PTMD 109. Wireless network 107 further enables communication with wireless devices, such as client computers 103-105. PTMD 109 is in communication with network 108 and server computers 110-111.

One embodiment of client computers 102-105 is described in more detail below in conjunction with FIG. 2. In one embodiment, at least some of client computers 102-105 may operate over wired and/or a wireless networks, such as networks 107 and/or 108. Generally, client computers 102-105 may include virtually any computing device, or computer capable of communicating over a network. It should be recognized, that more or less client computers may be included within a system such as described herein, and embodiments are therefore not constrained by the number or type of client computers employed.

Computers that may operate as client computer 102 may include computers that typically connect using a wired or wireless communications medium, such as personal computers, servers, multiprocessor systems, microprocessor-based or programmable consumer electronics, network PCs, or the like. In some embodiments, client computers 102-105 may include virtually any portable computing computer, or computer, capable of connecting to another computing device, or computer and communicating information, such as laptop computers, smart phones, mobile computers, tablet computers, or the like. However, client computers are not so limited and may also include other portable devices, such as cellular telephones, display pagers, radio frequency ("RF") devices, infrared ("IR") devices, Personal Digital Assistants ("PDAs"), wearable computers, integrated devices combining one or more of the preceding devices, and the like. As such, client computers 102-105 typically range widely in terms of capabilities and features. Moreover, client computers 102-105 may provide access to various computing applications, including a browser, or other web-based applications.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages ("WAP"), and the like. In one embodiment, the browser application is enabled to employ Handheld Device Markup Language ("HDML"), Wireless Markup Language ("WML"), WMLScript, JavaScript, Standard Generalized Markup Language ("SGML"), Hypertext Markup Language ("HTML"), eXtensible Markup Language ("XML"), and the like, to display and send a message. In one embodiment, a user of the client computer may employ the browser application to perform various activities over a network (online). However, another application resident on the client computer may also be used to perform various online activities.

Client computers 102-105 also may include at least one other client application that is configured to communicate by receiving and/or sending data with one or more other computing devices and/or computers. The client application may include a capability to send and/or receive content, or the like. The client application may further provide information that identifies itself, including a type, capability, name, or the like. In one embodiment, client computers 102-105 may uniquely identify themselves through any of a variety of mechanisms, including a phone number, network address, MAC address. Mobile Identification Number ("MIN"), an electronic serial number ("ESN"), or other mobile device identifier. The information may also indicate a content format that the client computer is enabled to employ. Such information may be provided in a network packet, or the like, sent between other client computers, PTMD 109, server computers 110-111, or other computing devices.

Client computers 102-105 may further be configured to include a client application that enables an end-user to log into an end-user account that may be managed by another computer, such as server computers 110-111, or the like. Such end-user account, in one non-limiting example, may be configured to enable the end-user to manage one or more online activities, including in one non-limiting example, search activities, social networking activities, browse various websites, communicate with other users, participate in gaming, interact with various applications, or the like. However, participation in online activities may also be performed without logging into the end-user account.

Wireless network 107 is configured to couple client computers 103-105 and its components with network 108, Wireless network 107 may include any of a variety of wireless sub-networks that may further overlay stand-alone ad-hoc networks, and the like, to provide an infrastructure-oriented connection for client computers 102-105. Such sub-networks may include mesh networks, Wireless LAN ("WLAN") networks, cellular networks, and the like. In one embodiment, the system may include more than one wireless network.

Wireless network 107 may further include an autonomous system of terminals, gateways, routers, and the like connected by wireless radio links, and the like. These connectors may be configured to move freely and randomly and organize themselves arbitrarily, such that the topology of wireless network 107 may change rapidly.

Wireless network 107 may further employ a plurality of access technologies including 2nd (2G), 3rd (3G), 4th (4G) $5^{th}$ (5G) generation radio access for cellular systems, WLAN, Wireless Router ("WR") mesh, and the like. Access technologies such as 2G, 3G, 4G, 5G, and future access networks may enable wide area coverage for mobile computers, such as client computers 103-105 with various degrees of mobility. In one non-limiting example, wireless network 107 may enable a radio connection through a radio network access such as Global System for Mobil communication ("GSM"), General Packet Radio Services ("GPRS"), Enhanced Data GSM Environment ("EDGE"), code division multiple access ("CDMA"), time division multiple access ("TDMA"), Wideband Code Division Multiple Access ("WCDMA"), High Speed Downlink Packet Access ("HSDPA"), Long Term Evolution ("LTE"), and the like. In essence, wireless network 107 may include virtually any wireless communication mechanism by which information may travel between client computers 103-105 and another computing device, computer, network, and the like.

Network 108 is configured to couple network computers with other computing devices, and/or computers, including, server computers 110-111 through PTMD 109, client computer 102, and client computers 103-105 through wireless network 107. Network 108 is enabled to employ any form of computer readable media for communicating information from one electronic device to another. Also, network 108 can include the Internet in addition to LANs, WANs, direct connections, such as through a universal serial bus ("USB") port, other forms of computer readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other earner mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without hunt, for example, DS-0, DS-1, DS-2, DS-3, DS-4, OC-3, OC-12, OC-48, or the like. Furthermore, remote computers and other related electronic devices could, be remotely connected to either LANs or WANs via a modem, and temporary telephone link. In one embodiment, network 108 may be configured to transport information of an Internet Protocol ("IP"). In essence, network 108 includes any communication method by which information may travel between computing devices and/or computers.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, EE, infrared, and other wireless media.

One embodiment of PTMD 109 is described in more detail below in conjunction with FIG. 3. Briefly, however, PTMD 109 may include virtually any network computer capable of managing network traffic between client computers 102-105 and server computers 110-111. Such computers include, for example, routers, proxies, firewalls, load balancers, cache devices, devices that perform network address translation, or the like, or any combination thereof.

PTMD 109 may perform the operations of routing, translating, switching packets, network address translation, firewall services, network flow control, or the like. In one embodiment, PTMD 109 may inspect incoming network packets, and may perform an address translation, port translation, a packet sequence translation, and the like, and route the network packets based, at least in part, on the packet inspection. In some embodiments, PTMD 109 may perform load balancing operations to determine a server computer to direct a request. Such load balancing operations may be based on network traffic, network topology, capacity of a server, content requested, or other traffic distribution mechanisms.

PTMD 109 may include a control segment and a separate data flow segment. The control segment may include software-optimized operations that perform high-level control functions and per-flow policy enforcement for packet traffic management. In at least one of the various embodiments, the control segment may be configured to manage connection flows maintained at the data flow segment. In at least one of the embodiments, the control segment may provide instructions, such as, for example, a packet translation instruction, to the data flow segment to enable the data, flow segment to route received packets to a server computer, such as server computer 110-111. The data flow segment may include hardware-optimized operations that perform statistics gathering, per-packet policy enforcement (e.g., packet address translations), high-speed flow caches, or the like, on connection flows maintained at DFS between client computers, such as client computers 102-105, and server computers, such as server computers 110-111.

Server computers 110-111 may include virtually any network computer that may operate as a website server. However, server computers 110-111 are not limited to website servers, and may also operate as messaging server, a File Transfer Protocol (FTP) server, a database server, content server, application server, or the like. Additionally, each of server computers 110-111 may be configured to perform a different operation. Computers that may operate as server computers 110-111 include various network computers, including, but not limited to personal computers, desktop computers, multiprocessor systems, microprocessor-based or programmable consumer electronics, network PCs, server computers, network appliances, and the like.

Although FIG. 1 illustrates server computers 110-111 as single computers, the invention is not so limited. For example, one or more functions of each of server computers 110-111 may be distributed across one or more distinct network computers. Moreover, server computers 110-111 are not limited to a particular configuration. Thus, in one embodiment, server computers 110-111 may contain a plurality of network computers that operate using a master/slave approach, where one of the plurality of network computers of server computers 110-111 operate to manage and/or otherwise coordinate operations of the other network computers. In other embodiments, the server computers 110-111 may operate as a plurality of network computers within a cluster architecture, a peer-to-peer architecture, a cloud architecture, or the like. Thus, the invention is not to be construed as being limited to a single environment, and other configurations, and architectures are also envisaged.

Illustrative Client Computer

Figure 2:
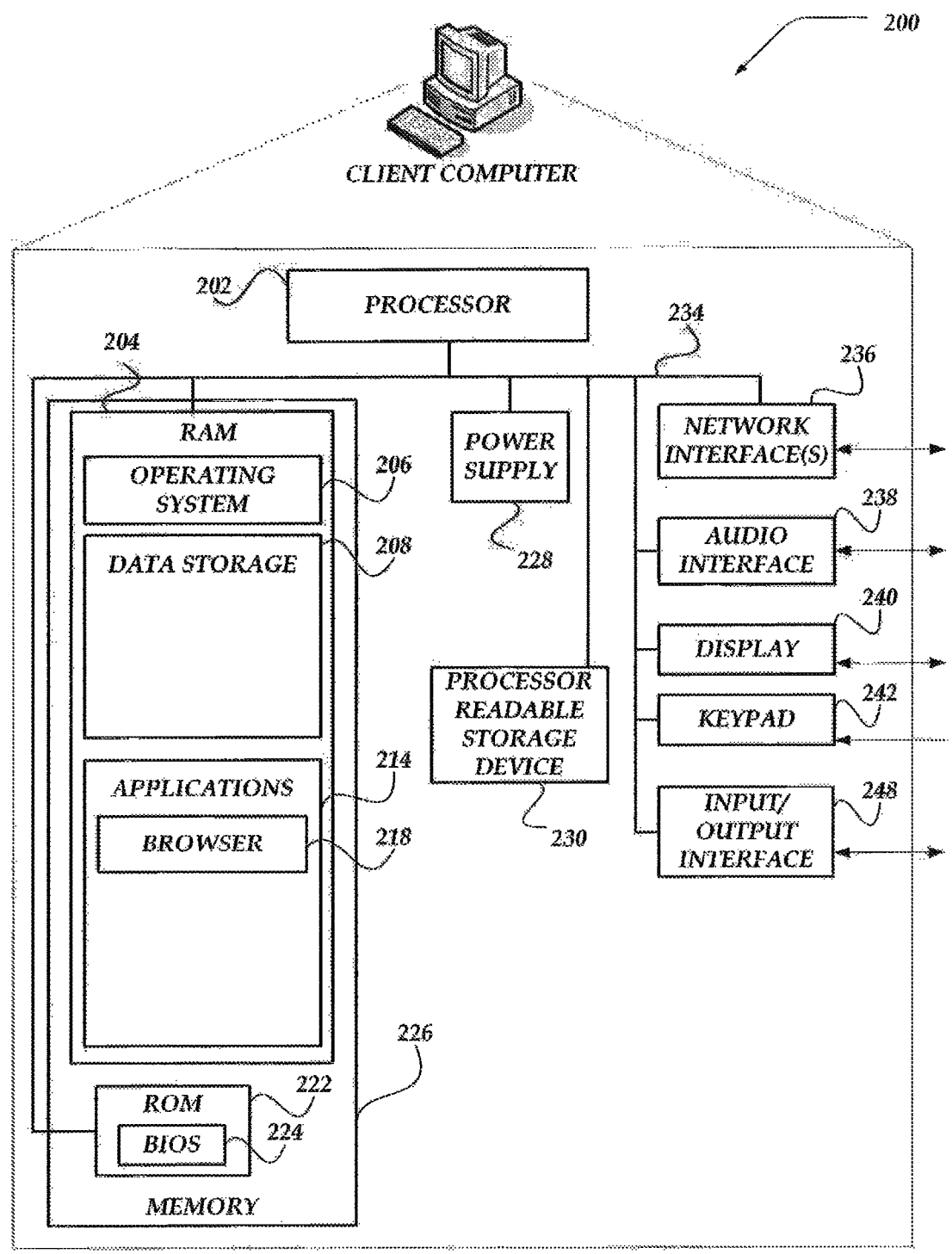
FIG. 2 shows an embodiment of a client computer that may be included in a system such as that shown in FIG. 1.

FIG. 2 shows one embodiment of client computer 200 that may be included in a system implementing embodiments of the invention. Client computer 200 may include many more or less components than those shown in FIG. 2. However, the components shown are sufficient to disclose an illustrative embodiment for practicing the present invention. Client computer 200 may represent, for example, one embodiment of at least one of client computers 102-105 of FIG. 1.

As shown in the figure, client computer 200 includes a processor 202 in communication with memory 226 via a bus 234. Client computer 200 also includes a power supply 228, one or more network interfaces 236, an audio interlace 238, a display 240, a keypad 242, and an input/output interface 248.

Power supply 228 provides power to client computer 200. A rechargeable or non-rechargeable battery may be used to provide power. The power may also be provided by an external power source, such as an AC adapter or a powered docking cradle that supplements and/or recharges a battery.

Client computer 200 may optionally communicate with a base station (not shown), or directly with another computing device and/or computer. Network interface 236 includes circuitry for coupling client computer 200 to one or more networks, and is constructed for use with one or more communication protocols and technologies including, but not limited to, global system for mobile communication ("GSM"), code division multiple access ("CDMA"), time division multiple access ("TDMA"), High Speed Downlink Packet Access ("HSDPA"), Long Term Evolution ("LTE"), user datagram protocol ("UDP"), transmission control protocol/Internet protocol ("TCP/IP"), short message service ("SMS"), general packet radio service ("GPRS"), WAP, ultra wide band ("UWB"), IEEE 802.16 worldwide Interoperability for Microwave Access ("WiMax"), session initiated protocol/real-time transport protocol ("SIP/RTP"), or any of a variety of other wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display ("LCD"), gas plasma, light emitting diode ("LED"), or any other type of display used with a computing device and/or computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Client computer 200 may also include a GPS transceiver (not shown) to determine the physical coordinates of client computer 200 on the surface of the Earth. A GPS transceiver typically outputs a location as latitude and longitude values. However, the GPS transceiver can also employ other geo-positioning mechanisms, including, but not limited to, triangulation, assisted GPS ("AGPS"), Enhanced Observed Time Difference ("E-OTD"), Cell Identifier ("CI"), Service Area Identifier ("SAI"), Enhanced Timing Advance ("ETA"), Base Station Subsystem ("BSS"), or the like, to further determine the physical location of client computer 200 on the surface of the Earth. It is understood that under different conditions, a GPS transceiver can determine a physical location within millimeters for client computer 200; and in other cases, the determined physical location may be less precise, such as within a meter or significantly greater distances. In one embodiment, however, client computer 200 may through other components, provide other information that may be employed to determine a physical location of the computer, including for example, a Media Access Control ("MAC") address, IP address, or the like.

Memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client computer 200. The mass memory also stores an operating system 206 for controlling the operation of client computer 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another device or computer based on any of a variety of events, including being sent as part of a header during a communication, sent upon request, or the like. Data storage 208 may also be employed to store social networking information including address books, buddy lists, aliases, user profile information, or the like. Further, data storage 208 may also store message, web page content, or any of a variety of user generated content. At least a portion of the information may also be stored on another component, of network computer 200, including, but not limited to processor readable storage device 230, a disk drive or other computer readable storage medias (not shown) within client computer 200.

Processor readable storage device 230 may include volatile, nonvolatile, removable, and non-removable media implemented in any method or technology for storage of information, such as computer- or processor-readable instructions, data structures, program modules, or other data, Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical medium which can be used to store the desired information and which can be accessed by a computing device and/or computer. Processor readable storage device 230 may also be referred to herein as computer readable storage media.

Applications 214 may include computer executable instructions which, when executed by client computer 200, transmit, receive, and/or otherwise process network data.

Network data may include, but is not limited to, messages (e.g., SMS, Multimedia Message Service ("MMS"), instant message ("IM"), email, and/or other messages), audio, video, and enable telecommunication with another user of another client computer. Applications 214 may include, for example, browser 218, Applications 214 may include other applications, which may include, but are not limited to, calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth.

Browser 218 may include virtually any application configured to receive and display graphics, text, multimedia, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client computer 200 to communicate with another network computer, such as PTMD 109 and/or indirectly with server computers 110-111.

Illustrative Network Computer

Figure 3:
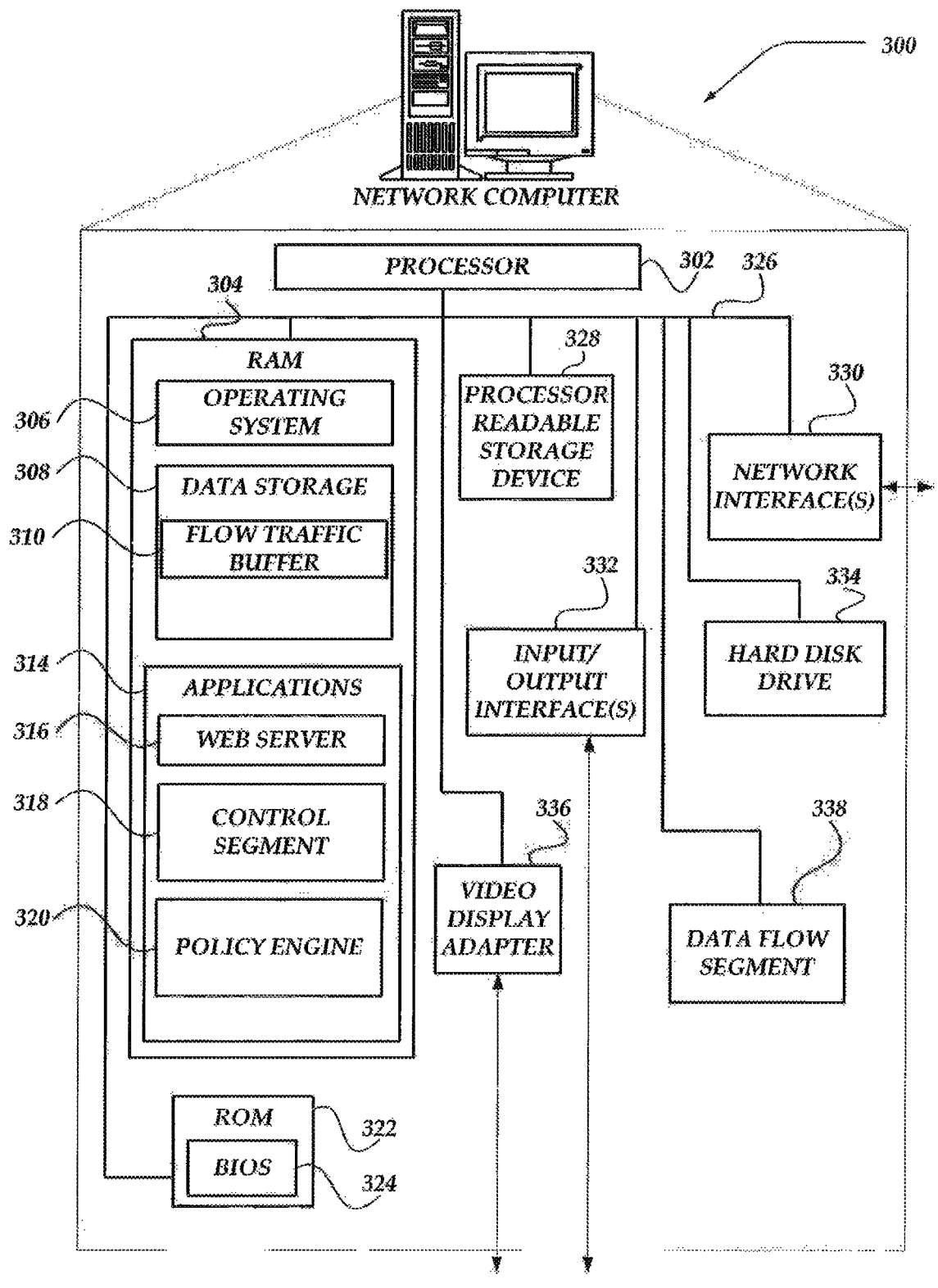
FIG. 3 shows an embodiment of a network computer that may be included in a system such as that shown in FIG. 1.

FIG. 3 shows one embodiment of a network computer 300, according to one embodiment of the invention. Network computer 300 may include many more or less components than those shown, Use components shown, however, are sufficient to disclose an illustrative embodiment for practicing the invention. Network computer 300 may be configured to operate as a server, client, peer, a host, or any other computer. Network computer 300 may represent, for example PTMD 109 of FIG. 1, server computers 110-111 of FIG. 1, and/or other network computers.

Network computer 300 includes processor 302, processor readable storage device 328, network interface unit 330, an input/output interface 332, hard disk drive 334, video display adapter 336, data flow segment ("DFS") 338 and a mass memory, all in communication with each other via bus 326. The mass memory generally includes RAM 304, ROM 322 and one or more permanent mass storage devices, such as hard disk drive 334, tape drive, optical drive, and/or floppy disk drive. The mass memory stores operating system 306 for controlling the operation of network computer 300. Any general-purpose operating system may be employed, Basic input/output system ("BIOS") 324 is also provided for controlling fire low-level operation of network computer 300, As illustrated in FIG. 3, network computer 300 also can communicate with the Internet, or some other communications network, via network interface unit 330, which is constructed for use with various communication protocols including the TCP/IP protocol Network interface unit 330 is sometimes known as a transceiver, transceiving device, or network interface card ("NIC").

Network computer 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer readable media, namely computer readable storage media and/or processor readable storage media, including processor readable storage device 328, Processor readable storage device 328 may include volatile, nonvolatile, removable, and non-removable media implemented in any method or technology for storage of information, such as computer readable instructions, data structures, program modules, or other data. Examples of processor readable storage media include RAM, ROM. EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device and/or computer.

Data storage 308 may include a database, text, spreadsheet, folder, file, or the like, that may be configured to maintain and store user account identifiers, user profiles, email addresses, IM addresses, and/or other network addresses; or the like. Data stores 308 may further include program code, data, algorithms, and the like, for use by a processor, such as central processing unit 302 to execute and perform actions. Also, in at least one of the various embodiments, data, storage 308 may include, one or more flow traffic buffers, such as, flow traffic buffer 310 for buffering network flow traffic for determining if the network flow should be assigned to a proxy data path or a standard data path. In one embodiment, at least some of data store 308 might also be stored on another component of network computer 300, including, but not limited to processor-readable storage device 328, hard disk drive 334, or the like.

The mass memory may also stores program code and data. One or more applications 314 may be loaded info mass memory and run on operating system 306. Examples of application programs may include transcoders, schedulers, calendars, database programs, word, processing programs. Hypertext Transfer Protocol ("HTTP") programs, customizable user interface programs. IPSec applications, encryption programs, security programs. SMS message servers, IM message servers, email servers, account managers, and so forth, Web server 316, control segment ("CS") 318, and policy engine 320, may also be included as application programs within applications 314.

Web server 316 represent any of a variety of services that are configured to provide content, including messages, over a network to another computing device and/or computer. Thus, web server 316 includes, for example, a web server, a File Transfer Protocol ("FTP") server, a database server, a content server, or the like. Web server 316 may provide the content including messages over the network using any of a variety of formats including, but not limited to WAP, HDML, WML, SGML, HTML, XML, Compact HTML ("cHTML"), Extensible HTML ("xHTML"), or the like. Web server 316 may also be configured to enable a user of a client computer, such as client computers 102-105 of FIG. 1, to browse websites, upload user data, or the like.

Network computer 300 may also include DFS 338 for maintaining connection flows between client computers, such as client computers 102-105 of FIG. 1, and server computers, such as server computers 110-111 of FIG. 1. In one embodiment, DFS 338 may include hardware-optimized operations for packet traffic management, such as repetitive operations associated with packet traffic management. For example, DFS 338 may perform statistics gathering, per-packet policy enforcement (e.g., packet address translations), or the like, on connection flows maintained at DFS 338. In some embodiments, DFS 338 may route, switch, forward, and/or otherwise direct packets based on policy rules for a particular connection flow signature (e.g., a 5 tuple of a received packet). Thus, DFS 338 may include capabilities and perform tasks such as that of a router, a switch, a routing switch, firewalls, network address translation, or the like. In some embodiments, the policy rules for a particular connection flow signature may be based on instructions received from CS 318. In one embodiment, DFS 338 may store the instructions received from CS 318 in a local memory as a table or some other data structure. In some other embodiments. DFS 338 may also store a flow state table to indicate a state of current connection flows maintained at DFS 338. In at least one of the various embodiments, components of DFS 338 may comprise and/or work in combination to provide high-speed flow caches for optimizing packet traffic management. In at least one of the various embodiments, CS 318 may provide connection updates to DFS 338 that may include activating or deactivating one or more protocol options for a particular connection flow, such as, turning on or off SYN-Cookie for TCP flows, or the like.

In some embodiments, DFS 338 may provide connection flow updates to CS 318. In one embodiment, a connection flow update may include a status of the connection flow, a current state of the connection flow, other statistical information regarding the connection flow, or the like. The connection flow update may also include an identifier that corresponds to the connection flow. The identifier may be generated and provided by CS 318 when a connection flow is established at DFS 338. In some embodiments, the connection flow update may be a connection flow delete update provided to CS 318 after the connection flow is terminated at DFS 338. The connection flow update and/or the connection flow delete update may be provided to CS 318 periodically, at predefined time intervals, or the like. In some embodiments, DFS 338 may stagger a time when a plurality of connection flow updates are provided to CS.

In some other embodiments, DFS 338 may include a plurality of data flow segments, in one non-limiting example, a first data flow segment within DFS 338 may forward packets received from a client computer to a server computer, while a second data flow segment within DFS 338 may forward and/or route packets received from a server computer to a client computer. In at least one of the various embodiments, DFS 338 may also be implemented in software.

In at least one of the various embodiments, DFS 338 may include different data paths, such as, proxy data paths or standard data paths. Proxy data paths may be optimized to support proxy policy rules. Standard data paths may be optimized to support standard policy rules.

CS 318 may include a control segment that may include software-optimized operations to perform high-level control functions and per-flow policy enforcement for packet traffic management. CS 318 may be configured to manage connection flows maintained at DFS 338. In one embodiments, CS 318 may provide instructions, such as, for example, a packet address translation instructions, to DFS 338 to enable DFS 338 to forward received packets to a server computer, such as server computer 110-111 of FIG. 1. In some other embodiments, CS 318 may forward and/or route packets between a client computer and a server computer independent of DFS 338.

In at least one of the various embodiments, CS 318 may include a plurality of control segments. In some embodiments, a plurality of control segments may access and/or manage connection flows at a single data flow segments and/or a plurality of data flow segments. In some other embodiments, CS 318 may include an internal data flow segment. In one such embodiment, the internal data flow segment of CS 318 may be distributed and/or separate from CS 318, For example, in one embodiment, CS 318 may be employed in software, while the internal data flow segment may be employed in hardware. In some other embodiments, CS 318 may identify if connection flows are split between different data flow segments and/or between a DFS 338 and CS 318. In at least one embodiment, CS 318 may also be implemented in hardware.

In at least one of the various embodiments, CS 318 may be configured to generate an identifier for each connection flow established at DFS 338. In some embodiments, CS 318 may utilize a sequence number of a SYN to generate an identifier for a corresponding connection flow. In one embodiment, the identifier may be based on a hash of the sequence number. In another embodiment, the identifier may be based on an exclusive OR byte operation of the sequence number. CS 318 may cache the identifier at CS 318 and may provide the identifier to DFS 338. In some embodiments, CS 318 may cache an identifier for each connection flow it establishes at DFS 338.

In at least one of the various embodiments, policy engine 320 may be arranged for executing one or more network traffic management policies for network traffic managed by the PTMD. Policy engine 320 may be arranged to include policy information that may be used to determine if a policy may be applicable to a network flow. Accordingly, policy engine 320 may monitor one or more network flows for determining which policy may apply to the network flow. Further, in at least one of the various embodiments, policy engine 320 may be arranged to determine which data path, if any, is appropriate for network.

Illustrative Logical Architecture

Figure 4A:
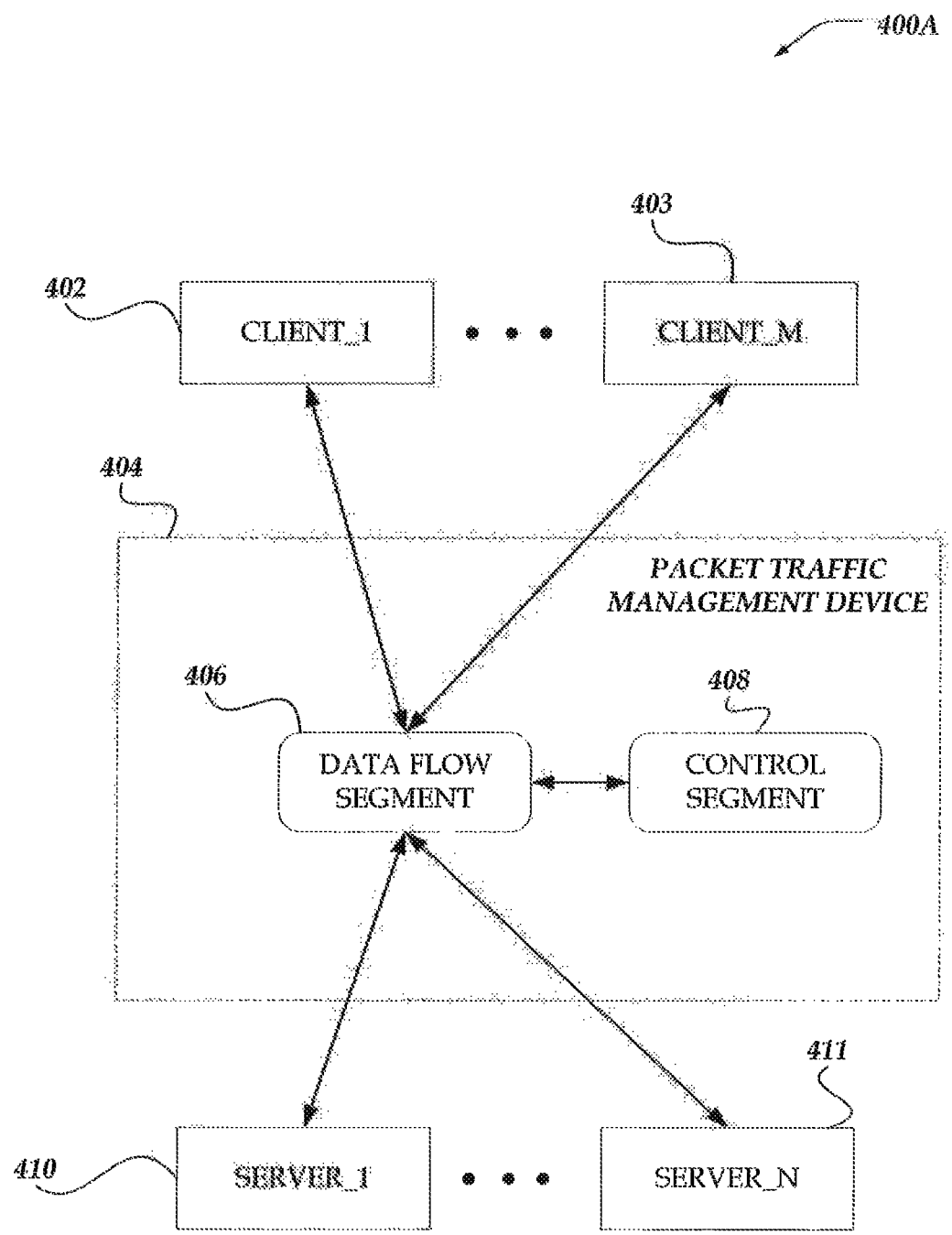
FIGS. 4A and 4B illustrate overview system diagrams generally showing embodiments of a packet traffic management computer disposed between client computers and server computers in accordance with the embodiments.

FIG. 4A illustrates a system diagram generally showing one embodiment of a system with a packet traffic management device disposed between client computers and server computers. System 400A may include packet traffic management device ("PTMD") 404 disposed between, client computers 402-403 and server computers 410-411. Client computers 402-403 may include Client_1 through Client_M, which may include one or more client computers, such as client computers 200 of FIG. 2. Server computers 410-411 may include Server_1 through Server_N, which may represent one or more server computers, such as server computers 110-111 of FIG. 1.

In one embodiment PTMD 404 may be an embodiment of PTMD 109 of FIG. 1. PTMD 404 may include data flow segment ("DFS") 406 in communication with control segment ("CS") 408. In at least one of the various embodiments, DFS 406 may be an embodiment of DFS 338 of FIG. 3, and CS 408 may be an embodiment of CS 318 of FIG. 3.

CS 408 may be configured to communicate with DFS 406, client computers 402-403 and/or server computers 410-411 independent of DFS 406, and/or any combination thereof. CS 408 may establish connection flows at DFS 406. In some embodiments. CS 408 may establish a connection flow at DFS 406 by providing instructions including flow control data to DFS 406 that enables DFS 406 to forward packets received at PTMD 404. In one embodiment, CS 408 may perform a load balancing operation to select a server computer of server computers 410-411 to receive packets sent from a client computer, such as client computer 402. In some other embodiments, CS 408 may generate and cache a connection flow identifier to be provided to DFS 406 when the connection flow is established.

DFS 406 may be configured to facilitate communications between client computers 402-403 and server computers 410-411. DFS 406 may process and forward packets received at PTMD 404 based on the instructions and flow control data received from CS 408. For example, in one embodiment, DFS 406 utilizes the instructions and/or flow control data to forward packets received from client computer 402 to server computer 410 and to forward packets received from server computer 410 to client computer 402. In some embodiments, DFS 406 may forward predetermined packets to CS 408, such as, but not limited to, new connection flow requests (e.g., associated with a SYN). In yet other embodiments, DFS 406 may notify CS 408 that a packet was received and forwarded. In one non-limiting, non-exhaustive example, DFS 406 may notify CS 408 that an ACK was received from client computer 402 and forwarded to server computer 410. In at least one of the various embodiments, DFS 406 may also provide connection flow updates and a corresponding connection flow identifier to CS 408. CS 408 may compare the corresponding connection flow identifier with the cached identifier to determine if the connection flow update is valid.

In at least one of the various embodiments, DFS 406 may send evict messages to CS 408 if connection flows are evicted from the DFS 406. In at least one of the various embodiments, DFS 406 may evict a connection flow if new flows arrive and the capacity of the DFS to handle new connection flow may be exceeded. In at least one of the various embodiments, evictions from DFS 406 may occur if the high speed flow cache for storing flow control data exhausts its ability to store the flow control data for new connection flows. In at least one of the various embodiments, evict messages sent from DFS 406 to CS 408 may contain enough information to fully identify the connection flow (e.g., endpoints, ports, sequence numbers, flow state, VLAN ID, or the like).

In at least one of the various embodiments, CS 408 may receive and route packets associated with evicted connection flows, thereby taking on some of the duties of DFS 406. In at least one of the various embodiments, some new connection flow may not be offloads to DFS 406 if CS 408 determines that the connection flows may be management on the CS or if the CS determines that more information may be required to determine if the connection flow should be offloaded to DFS 406.

Although PTMD 404 illustrates DFS 406 and CS 408 as two partitions within a single PTMD 404, the invention is not so limited. Rather, in some embodiments, DFS 406 and CS 408 may be functional blocks in a same PTMD 404 (i.e., a same chassis/computing device). In other embodiments, DFS 406 may be implemented by one or more chassis/computing devices separate from one or more other chassis/computing devices that may be utilized to implement CS 408. In yet other embodiments. CS 408 may be a module that plugs into DFS 406, Additionally, it is envisaged that the functionality of either DFS 406 and/or CS 408 may be separately implemented in software and/or hardware.

Figure 4B:
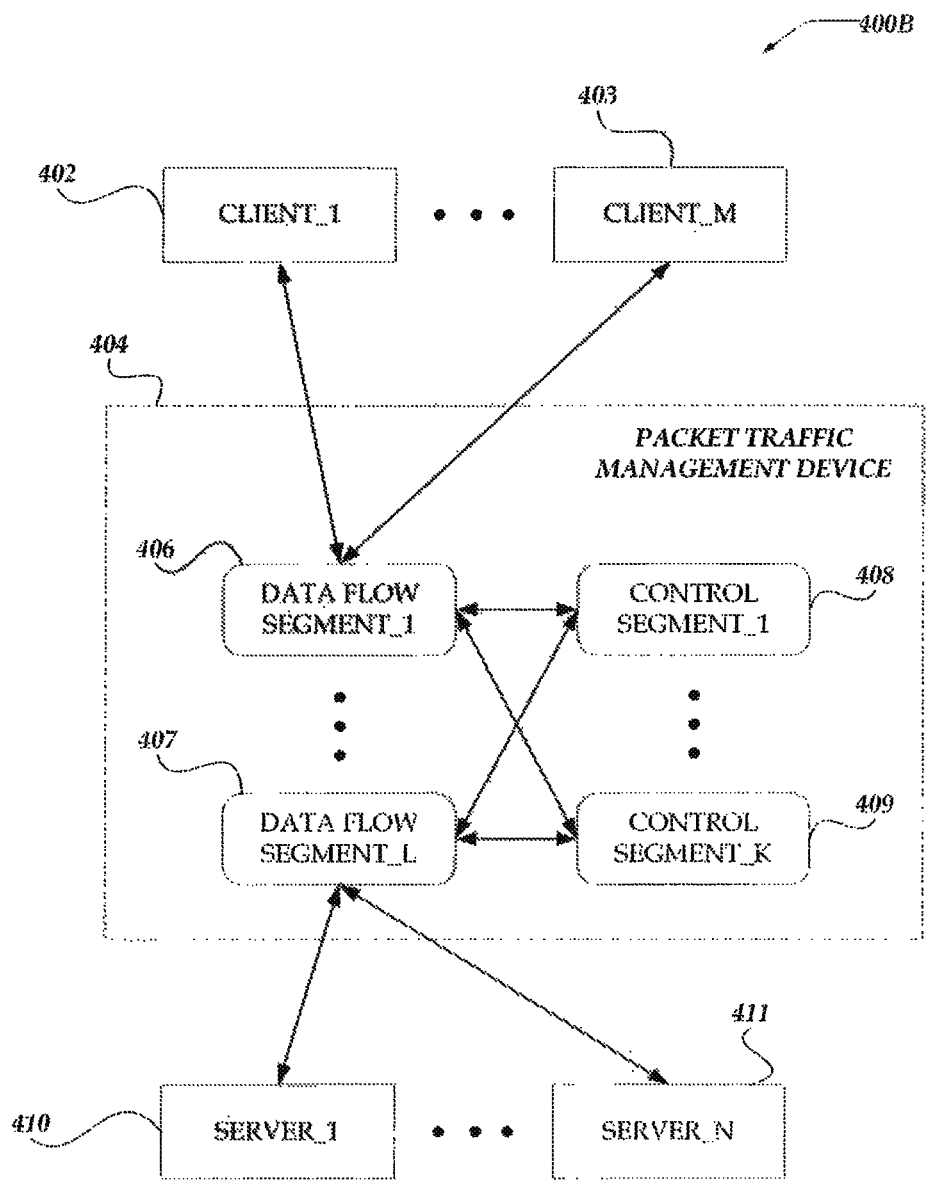

FIG. 4B illustrates a system diagram generally showing one embodiment of a system with a packet traffic management device disposed between client computers and server computers, System 400B may include packet traffic management device ("PTMD") 404 disposed between client computers 402-403 and server computers 410-411. Client computers 402-403 may include Client_1 through Client_M, which may include one or more client computers, such as client computers 102-105 of FIG. 1. Server computers 410-411 may include Server_1 through Server_N, which may include one or more server computers, such as server computers 110-111 of FIG. 1.

In one embodiment, PTMD 404 may be an embodiment of PTMD 404 of FIG. 4. PTMD 404 may include data flow segments ("DFS") 406-407 and control segments ("CS")

408-409. DFS 406-407 may include a plurality of data flow segments, each of which may be an embodiment of DFS 406 of FIG. 4A. CS 408-409 may include a plurality of control flow segments, each of which may be an embodiment of CS 408 of FIG. 4.

In some embodiments, data communicated between client computers 402-403 and server computers 410-411 may flow through one or more data flow segments 406-407. In one embodiment, data from client computers 402-403 may flow through a first DFS, such as DFS 406 and data from server computers 410-411 may flow through a second DFS, such as DFS 407.

In at least one of the various embodiments, one or more data flow segments of DFS 406-407 may communicate with one or more control segments of CS 408-409. Similarly, one or more control segments of CS 408-409 may communicate with one or more data flow segments of DFS 406-407. In some embodiments, each control segment of CS 408-409 may communicate (not shown) with other control segments of CS 408-409. In other embodiments, each data flow segment of DFS 406-407 may communicate (not shown) with other data flow segments of DFS 406-407.

Also, in at least one of the various embodiments, connection flows may be split into flow portions based on the direction of network packet travel. In at least one of the various embodiments, the network packets coming from the client may be treated as a separate connection flow and the network packets coming from a server and directed towards a client may be treated as a separate connection flow. In at least one of the various embodiments, this enables optimizations based on the amount of network packet traffic of a particular split connection flows. In at least one of the various embodiments, this may enable the upload and download direction portion of connection flows to be split across CS 408-409 and DFS 406-407 based on the characteristics of the upload and download portions of the connection flows. For example, in at least one of the various embodiments, if downloading streaming video may be a very asymmetric operation having many network packets download to the client and few uploaded. In at least one of the various embodiments, the upload and download portions of connection flow in the download direction may be optimized independent with one portion using the DFS and a high-speed flow cache and the other portion may be handled on the CS using lower performing (e.g., less expensive) resources.

Figure 5:
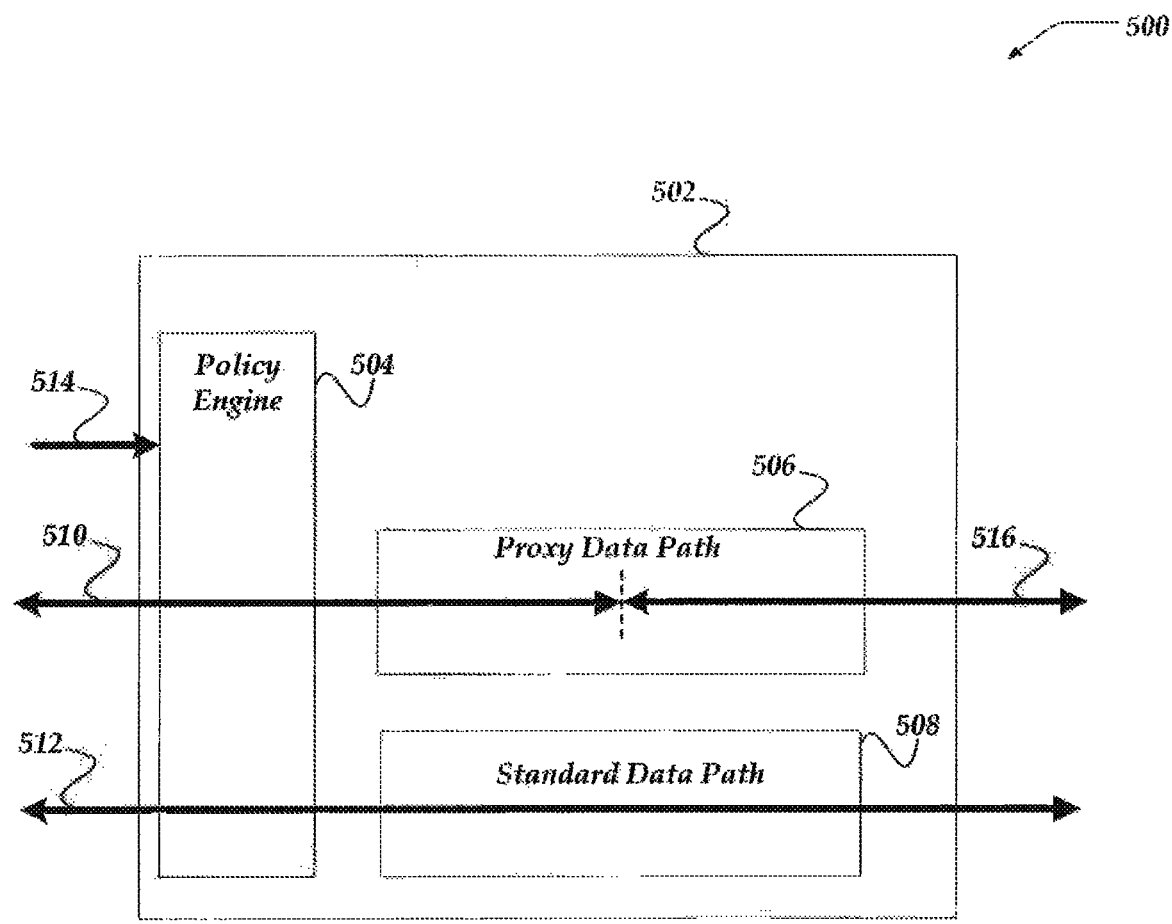
FIG. 5 shows a logical schematic of a system that includes multiple data paths in accordance with at least one of the various embodiments.

FIG. 5 shows a logical schematic of system 500 that includes multiple data paths in accordance with at least one of the various embodiments. In at least one of the various embodiments, PTMD sub-system 502 may be arranged to include policy engine 504, proxy data path 506, standard data path 508, or the like. In at least one of the various embodiments, policy engine 504 may be included in, or a portion of policy engine 320. Further, for some embodiments, network flow 510 and network flow 512 may represent network flows that may be under management by a PTMD, such as, PTMD 109. In at least one of the various embodiments, network flow 510 may represent provided network flows that are managed under proxy policies. Likewise, in at least one of the various embodiments, network flow 512 may represent network flows that are managed under standard policies.

In at least one of the various embodiments, network flow 514 may represent one or more network flows that may be unclassified. Accordingly, in at least one of the various embodiments, the applicable policies and/or policy rules for network flow 514 have not been determined. Accordingly, in at least one of the various embodiments, the network traffic associated with network flow 514 may be buffered for making a determination of whether network flow 514 should be assigned to proxy data path 506 or standard data path 508.

In at least one of the various embodiments, since network flow 510 is under management of proxy policies, PTMD sub-system 502 may be enabled to perform actions to enforce the proxy policies, such as, complex redirection, load balancing, forward proxying, reverse proxying, or the like, or combination thereof. Accordingly, in at least one of the various embodiments, policy engine 504 or proxy data path 506 may manipulate network flow 510 as part of executing the proxy policies. In at least one of the various embodiments, since network flows assigned to proxy data path have proxy actions, the provided network flow, such as, network flow 510, may be terminated at the PTMD and another network flow, such as, network flow 516 may be generated in accordance with the proxy action included in the determined policy. In at least one of the various embodiments, network flow 516 may communicate with other network devices, networks, network computer, client computers, PTMDs, or the like, or combination thereof, in accordance with the actions specified in the proxy policy.

In at least one of the various embodiments, network flow 512 is under management of standard policies, so the traffic of network flow 512 may flow unbroken through standard datapath 508. In at least one of the various embodiments, network flows assigned to a standard data path may be associated with standard policies.

In at least one of the various embodiments, PTMD sub-system 502 may be a portion of a PTMD, such as, PTMD 109, network computer 300, PTMD 400A, PTMD 400B, or the like. As presented, PTMD sub-system 502 clarifies the relationship between different types of data paths, different types of policies (e.g., proxy v. standard), the policy engine, network flows, or the like. In at least one of the various embodiments, one or more of the elements of PTMD sub-system 502 may be incorporated in PTMD 109, network computer 300, PTMD 400A, PTMD 400B, or the like, or combination thereof. Further, in at least one of the various embodiments, one or more of the elements of PTMD sub-system 502 may be incorporated in CS 318, policy engine 320, DFS 338, or the like, or combination thereof.

Generalized Operation

The operation of certain aspects of the invention will now be described with respect to FIGS. 6-8. In at least one of various embodiments, processes 600, 700, and 800 described in conjunction with FIGS. 6-8, respectively, may be implemented by and/or executed on a network computer, such as network computer 300 of FIG. 3. In other embodiments, these processes or portions of these processes may be implemented by and/or executed on a plurality of network computers, such as network computer 300 of FIG. 3. Further, in other embodiments, these processes or portions of these processes may be implemented by and/or executed on one or more client computers, such as client computer 200 as shown in FIG. 2. However, embodiments are not so limited and various combinations of network computers, or the like, may be utilized.

Figure 6:
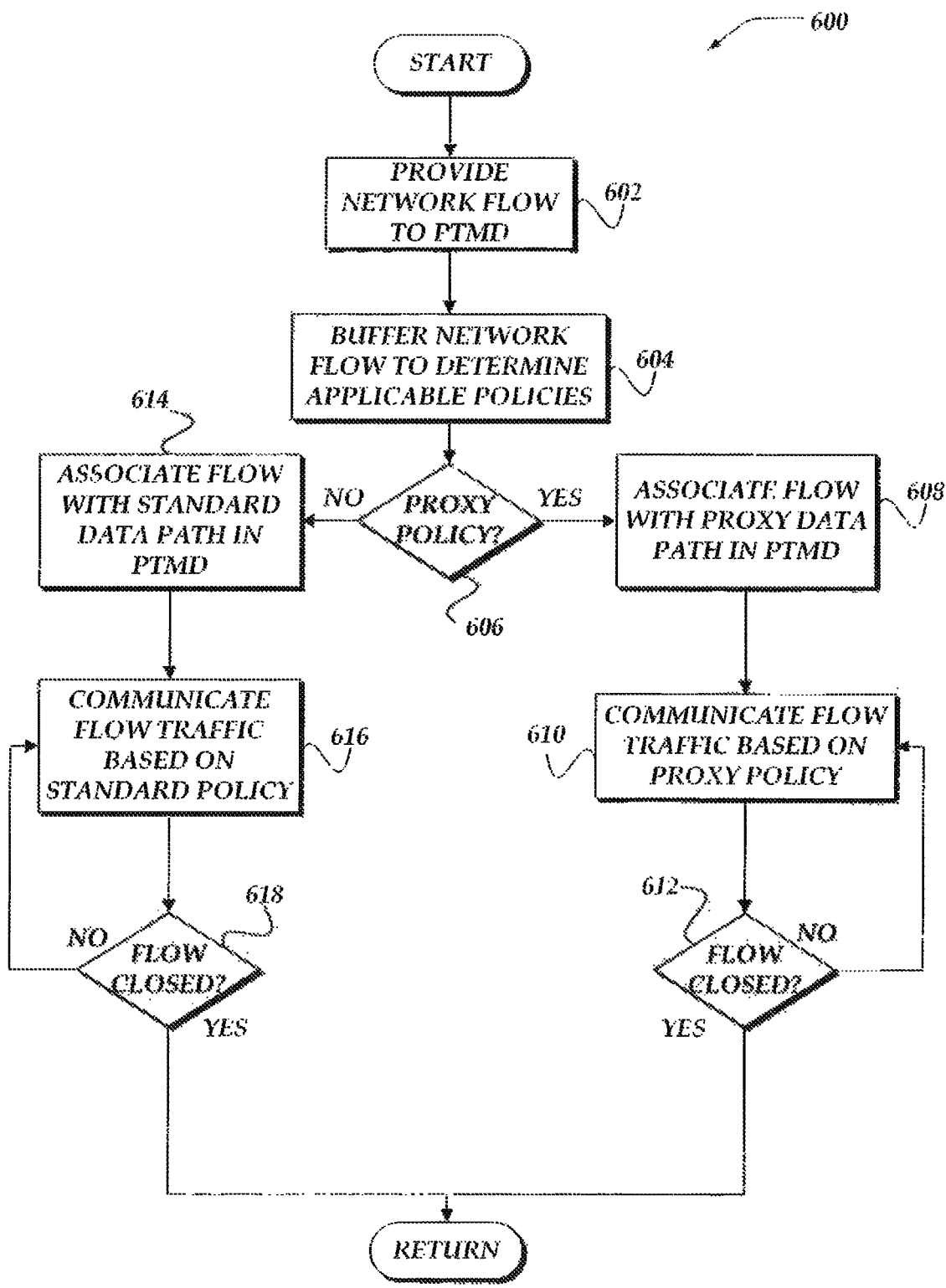
FIG. 6 shows an overview flowchart for a process for delayed traffic policy determination in accordance with at least one of the various embodiments.

FIG. 6 shows an overview flowchart for process 600 for delayed proxy action determination in accordance with at least one of the various embodiments. After a start block, at block 602, in at least one of the various embodiments, a network flow may be provided to a PTMD. In at least one of the various embodiments, a computer may initiate a request for a network service and/or application that may be managed by the PTMD. For example, a client computer may send a HTTP GET request to a URI that is managed by the PTMD. In at least one of the various embodiments, at the point of arrival to the PTMD, the network flow may be unassociated with a policy.

At block 604, in at least one of the various embodiments, the network flow may be buffered for determining which policy and/or policies should be applied to the provided flow. In at feast one of the various embodiments, the PTMD may be arranged to buffer the network flow traffic until it has determined a policy for managing the network flow or until the buffer capacity is exhausted. In at least one of the various embodiments, a policy engine, such as, policy engine 320, may be arranged to analyze the buffered network traffic for determining a policy for the network flow.

In at least one of the various embodiments, the policy engine may determine which policy to associate with a network flow based on, subscriber information included in the network traffic, tuple information associated with the network flow, one or more signature matches, or the like, or combination thereof.

At decision block 606, in at least one of the various embodiments, if the determined policies include one or more proxy policies, control may flow to block 608; otherwise, control may flow to block 614. In at least one of the various embodiments, the PTMD may be arranged to enforce a limit on the butter size used for determining the policy for the network flow. Accordingly, if the buffer size limit is met or exceeded the PTMD may be configured to assume that the network flow is associated with a standard policy; otherwise, the policy engine may determine if the policy associated with the network flow is a proxy policy or if it is a standard policy.

In at least one of the various embodiments, if a policy includes policy rules that include proxy actions, that policy may be determined be a proxy policy. Accordingly, in at least one of the various embodiments, policies that do not include policy rules that have proxy actions may be determined to be standard policies.

At block 608, in at least one of the various embodiments, the network flow may be assigned, to a proxy data path. In at least one of the various embodiments, the connection information for the network flow and/or instructions corresponding the determined proxy policy may be provided to a proxy data path included in a DFS, such as, DFS 338.

At block 610, in at least one of the various embodiments, the network flow traffic may be communicated based on the proxy policy. As discussed above, since the network flow is associated with a proxy policy, the actions dictated by the proxy policy may be performed. For example, in at least one of the various embodiments, if the proxy policy includes load balancing, the proxy policy may require the network flow traffic to be proxied between the PTMD and a server computer. Accordingly, in this example, for at least one of the various embodiments, this may require the PTMD to become an endpoint of the network flow and to create a new connection from the PTMD to the appropriate server computer. Continuing with this example, then the PTMD may proxy communication provided from the server computer over the new connection to the client computer over the old connection.

At decision block 612, in at least one of the various embodiments, if the network flow is closed, control may be returned to a calling process; otherwise, control may loop back to block 610 for Ore communication of more network traffic. In at least one of the various embodiments, the network flow may continue to be managed by the PTMD using the proxy data path until the network flow is closed, or otherwise terminated.

At block 614, in at least one of the various embodiments, since the policies determined to be associated with the provided connection flow are standard policies, the network flow may be assigned and/or moved to a standard data path. In at least one of the various embodiments, the standard data path may be arranged to enable network flows being managed under standard policies to communicate without being terminated and proxied by the PTMD. In at least one of the various embodiments, the connection information for the network flow and/or instructions corresponding the determined standard policy may be provided to a standard data path included in a DFS, CS, or the like, such as, DFS 338, or CS 318. In at least one of the various embodiments, the standard data path may be arranged to perform as a bump-on-the-wire device. Accordingly, in at least one of the various embodiments, the network flow may be provided directly to its destination rather than, being terminated at the PTMD.

At block 616, in at least one of the various embodiments, the network flow traffic may be communicated based on the determined standard policy. In at least one of the various embodiments, standard polices may include actions such as passively observing the amount of traffic that is being communicated over the network flow, HTTP redirection, packet dropping, or other bump-on-the-wire actions.

In at least one of the various embodiments, the PTMD may be arranged to ensure that the application information included in one or more of the network flows assigned to a standard data path is not modified, logged, recorded, scanned, or observed by the PTMD.

In at least one of the various embodiments, the standard data path may be arranged to limit PTMD access to OSI Layer 4 information for the network traffic associated with network flows managed using one or more standard policies.

At decision block 618, in at least one of the various embodiments, if the network flow is closed, control may be returned to a calling process; otherwise, control may loop back to block 616 for the communication of more network traffic. In at least one of the various embodiments, the network flow may continue to be managed by the PTMD using the standard data path until the network flow is closed, or otherwise terminated.

In at least one of the various embodiments, one or more instances of process 600 may be operating concurrently, each handling one or more network flows that may be under management by the PTMD.

Figure 7:
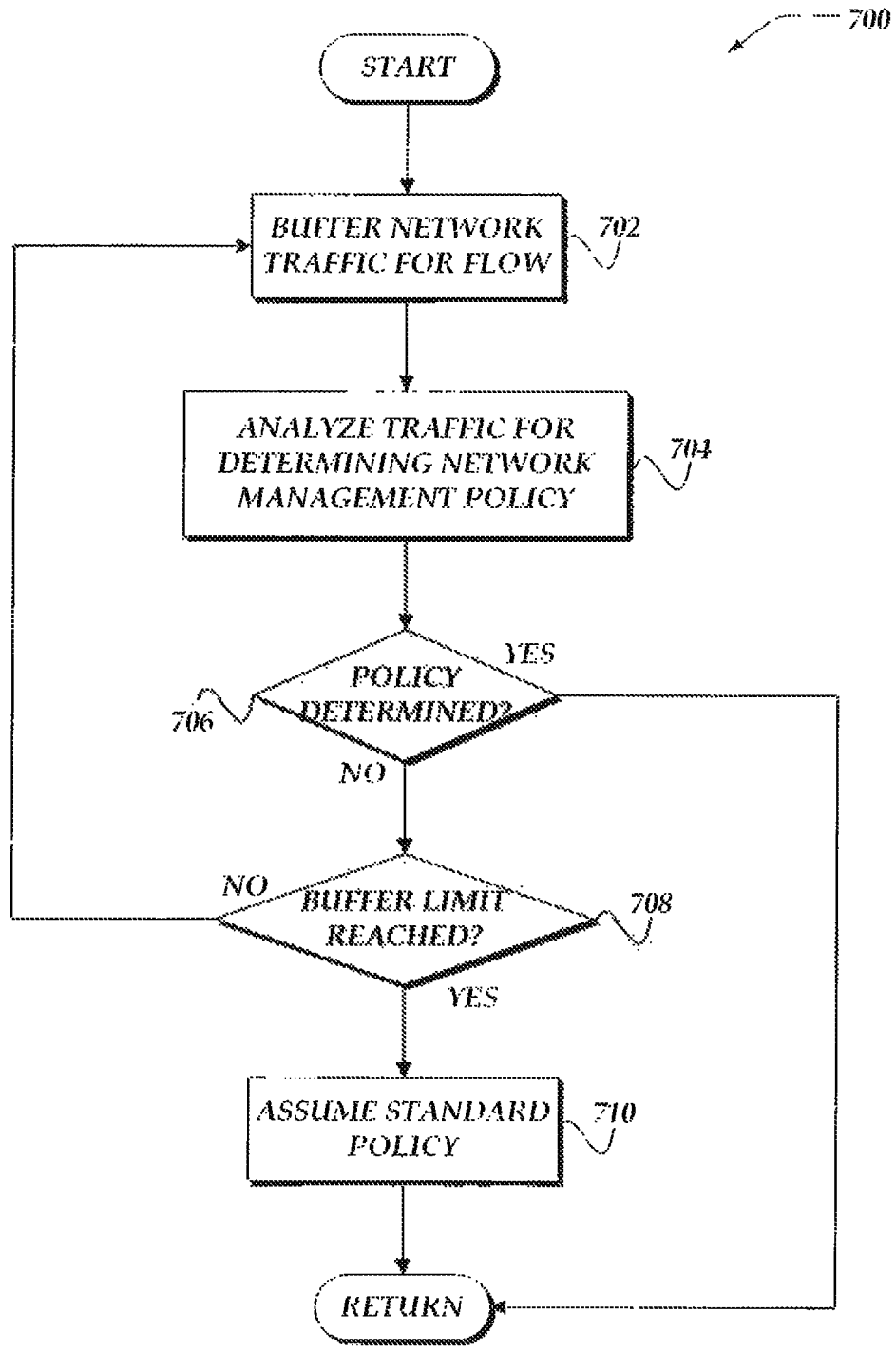
FIG. 7 shows a flowchart for a process for delayed traffic policy determination in accordance with at least one of the various embodiments.

FIG. 7 shows a flowchart for process 700 for delayed proxy action determination in accordance with at least one of the various embodiments. After a start block, at block 702, in at least one of the various embodiments, network traffic for a network flow may be buffered into a buffer in the PTMD. In at least one of the various embodiments, if a client computer initiates a network flow that may be managed by the PTMD, the network traffic associated with the network flow may be temporarily stored in a buffer to enable the PTMD to attempt to determine if the policies for managing the network flow, if any, are standard policies or proxy policies. In at least one of the various embodiments, the buffer, such as, flow traffic buffer 310, may be included in the PTMD.

At block 704, in at least one of the various embodiments, the buffered network traffic may be analyzed to determine the network policies associated with the network flow. In at least one of the various embodiments, a policy engine may be arranged to analyze the buttered traffic of the network flow. In at least one of the various embodiments, the policy engine may immediately begin analyzing the buffered information rather than waiting for the buffer to fill tip.

In at least one of the various embodiments, the policy engine may examine application layer (OSI Layer 7) information as part of determining the policies that may be associated with the network flow. Also, in at least one of the various embodiments, information associated with the "tuple" for the network flow may be employed as part of determining the applicable policies for the network flow.

In some embodiments, the network flow may be from a known and/or identifiable subscriber for services managed by the PTMD. Accordingly, the policy engine may be arranged to examine the buffer traffic to discover if a known subscriber identifier is included in the buffer traffic. Accordingly, in at least one of the various embodiments, if a subscriber identifier is discovered, the policy engine may be arranged to lookup policy information for the policies that may be associated with the identified subscriber.

In at least one of the various embodiments, using information included in the tuple of the network flow, the policy engine may determine potentially applicable policies based on one or more of, a source Internet Protocol (IP) address, a destination IP address, a source port number, a destination port number, virtual LAN segment identifier (VLAN ID), tunnel identifier, routing interface identifier, physical interface identifier, a protocol identifier, or the like.

Further, in at least one of the various embodiments, the policy engine may be arranged to determine a policy based on information included in high level protocol features, such as, HTTP header values, HTTP Cookies, URI values, query string information, packet size, or the like.

In at least one of the various embodiments, the policy engine may be arranged to determine policies based on a signature match for the network flow. The signature for a network flow may be defined using one or more of the network flow features described above. In at least one of the various embodiments, the signature match may be prioritized such that subscriber ID is checked first, then tuple information, and then OSI Layer 7 header information. In at least one of the various embodiments, signatures for matching policies to network flows may be determined based on combinations of the network flow features. Accordingly, in at least one of the various embodiments, policies that match a signature of a network flow may be identified. In at least one of the various embodiments, if multiple policies match the signature of a network, the policy engine may be arranged to determine a policy from the multiple matched policies, based on, sort order in a configuration, priority values associated with the policies, or the like.

In at least one of the various embodiments, determining the data path for a policy may be determined based on a configuration value associated with the policy. Accordingly, in at least one of the various embodiments, the configuration value may at least indicate which data path to associate with the network policy.

At decision block 706, in at least one of the various embodiments, if the policy is determined, control may flow to the return block where control may be returned to a calling process such as a policy engine for continued processing; otherwise, control may flow to decision block 708. In at least one of the various embodiments, process 700 may be arranged to return an identifier of the determined policy enabling it to be used to process the traffic of the network flow as soon as the policy is determined. If the policy engine has not been able to determine a policy for the network flow, more network traffic may be buffered. For example, in at least one of the various embodiments, if a subscriber identifier that corresponds to a policy is identified, process 700 may terminate provide the determined policy to the policy engine for further processing.

At decision block 708, in at least one of the various embodiments, if the buffer size limit/capacity is reached, control may flow to block 710; otherwise, control may loop back to block 702 to buffer more network traffic. In at least one of the various embodiments, the buffer size limit of the buffer may be configurable based on the type of traffic the PTMD may be expected to manage. For example, in at least one of the various embodiments, if the PTMD is expected to manage TCP/IP traffic, the buffer size limit may be configured to accommodate one or two TCP/IP packets based on the expected Maximum Transmission Unit (MTU) for the network (e.g., for Ethernet it may be 1500 bytes per packet). In at least one of the various embodiments, other information known to the operator may be considered for determining the buffer size limit, such as, the amount of data needed to make a policy determination for certain policies, expected connection rate, expected bandwidth, or the like.

At block 710, in at least one of the various embodiments, since the buffer size limit has been met or exceeded, the network flow may be treated as if it is associated with a proxy policy. Accordingly, rather than identifying a particular policy, the policy engine may just indicate that the proxy data path should be used. Accordingly, in at least one of the various embodiments, the policy engine may determine the policy as part of the normal proxy data path processing. Next, control may be returned to calling process.

In at least one of the various embodiments, the buffer size limit provides a limit to the amount of delay that is allowed before the network flow is processed by the PTMD, Since standard policies may be easy to determine, it may be unlikely that the buffer will be exhausted before identifying standard policies. Likewise, if a policy is not determined before the buffer is exhausted, the network flow may be assumed to have a proxy policy. In at least one of the various embodiments, as a result of process 700, the policy engine will have determined the policy that is associated with the network flow or it will provide an indication that a policy has not been determined before the buffer was exhausted.

Figure 8:
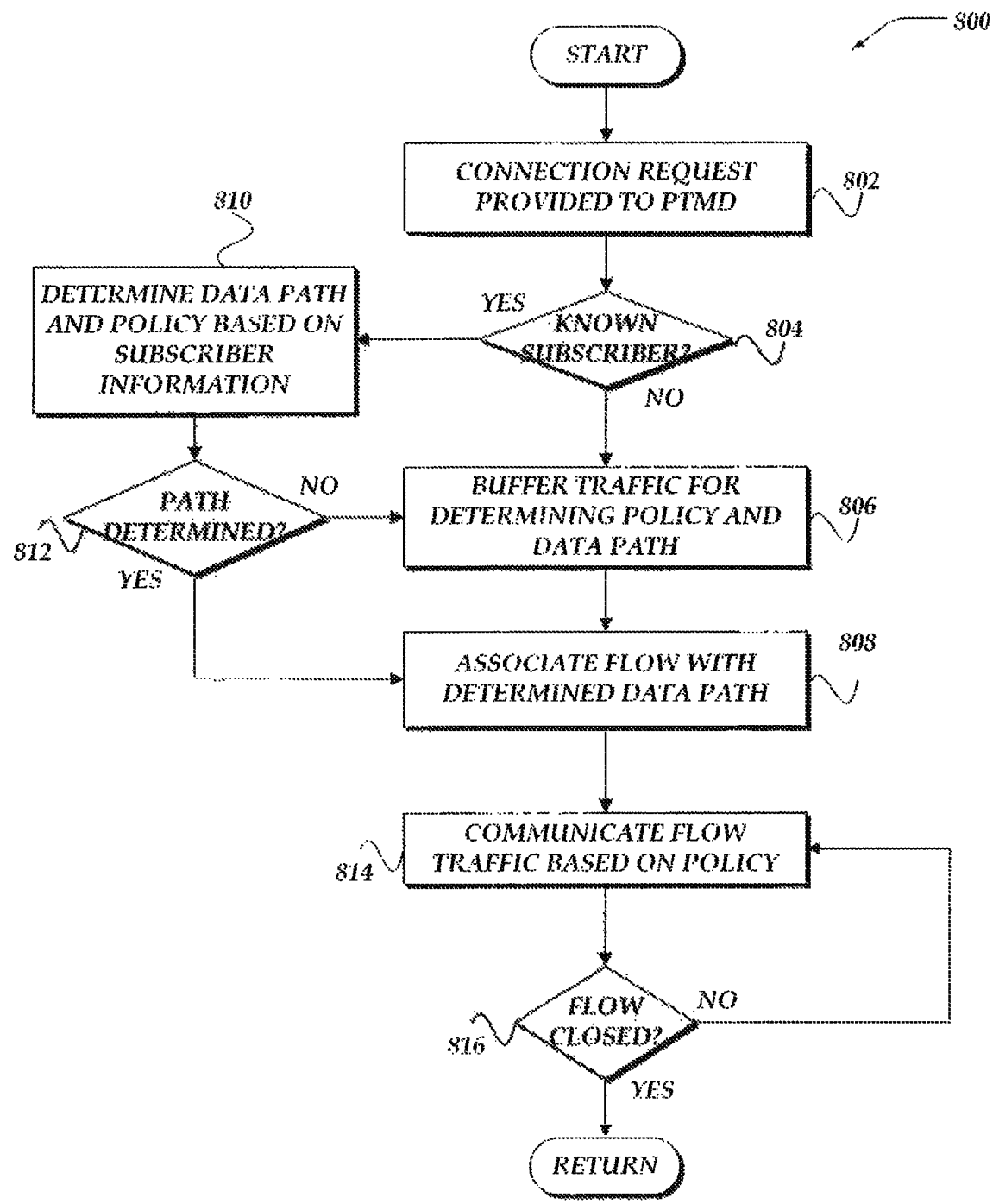
FIG. 8 shows a flowchart for a process for delayed traffic policy determination in accordance with at least one of the various embodiments.

FIG. 8 shows a flowchart for process 800 for delayed proxy action determination in accordance with at least one of the various embodiments. After a start block, at block 802, in at least one of the various embodiments, a connection request associated with a network flow may be provided to the PTMD. At decision block 804, in at least one of the various embodiments, if the network flow associated the connection is determined to be associated with a known subscriber that is recognized by the PTMD, control may flow to block 810; otherwise, control may flow to block 806.

In at least one of the various embodiments, the PTMD may be arranged to determine if the network flow is associated with a subscriber that may be known the PTMD. In at least one of the various embodiments, the subscriber may be determined based on information included in the network flow. Or, in at least one of the various embodiments, the subscriber information may be provided in a separate transaction from an external source, such as, a Remote Authentication Dial In User Set vice (RADIUS) server. In other embodiments, the subscriber information may be included in configuration information that may be associated with individual subscribers and/or subscriber classes based on souse or all of the tuple information associated with the network.

At block 806, in at least one of the various embodiments, network traffic for the network flow may be buffered for determining a data path and a policy based on the network flow. Since a subscriber for the network flow is not recognized, the PTMD may perform actions for buffering the traffic for determining the policy and data path for the network flow as described above. See, FIGS. 6-7 and accompanying descriptions.

At block 808, in at least one of the various embodiments, the network flow may be moved to the determined data path. In at least one of the various embodiments, the network flow may be assigned to fit least one of a proxy data path or a standard data path. See, FIGS. 6-7 and accompanying descriptions.

At block 810, in at least one of the various embodiments, since a subscriber associated with the network flow associated is recognized by the PTMD, the PTMD may attempt to determine the data path and/or policies for the network flow based on information associated with the subscriber.

In at least one of the various embodiments, the PTMD may be arranged to associate one or more policies with a subscriber. Accordingly, in at least one of the various embodiments. If the subscriber is known, the PTMD may be able to determine the policy without having to buffer the network traffic. For example, in at least one of the various embodiments, if the PTMD is configured such that all connections from a particular subscriber are associated with a proxy policy, the PTMD may assign all network flows associated with that particular subscriber to a proxy data path, thus avoiding the buffering steps.

At decision block 812, in at least one of the various embodiments, if the data path is determined, control may flow to block 808; otherwise, control may flow to block 806. In at least one of the various embodiments, if information associated with the subscriber is not sufficient for determining a policy and a data path, the buffering process may be employed. Likewise, if the policy has been determined, the buffering may be avoided.

At block 814, in at least one of the various embodiments, network traffic that may be associated with the network flow may be communicated based on the determined network policy.

At decision block 816, in at least one of the various embodiments, if the network flow is closed, control may be returned to a calling process; otherwise, control may loop back block 814. In at least one of the various embodiments, the network flow may continue to be managed by the PTMD using the determined data path until the network flow is closed, or otherwise terminated.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing examples should not be construed as limiting and/or exhaustive, but rather, an illustrative use case to show an implementation of at least one of the various embodiments of the invention.

What is claimed as new and desired to be protected by Letters Patent of the United States is:

1. A method for managing communication over a network with a traffic management device (TMD) that is operative to perform actions, comprising:
   buffering network traffic from one or more network flows on the TMD, wherein the TMD includes a proxy data path and a standard data path for communicating the network traffic to an endpoint, wherein an amount of the buffering is in part based on one or more types of the network traffic;
   determining one or more network policies that is associated with the one or more network flows based on a portion or more of the buffered data;
   employing the one or more network policies that include one or more proxy policy rules associated with a subscriber to select the proxy data path for association with those network flows associated with the subscriber;
   employing the one or more network policies that include just one or more standard policy rules to automatically select the standard data path for the one or more network flows that are unassociated with the subscriber;
   employing the one or more network policies that include policy rules for the one or more network flows that are unassociated with the subscriber and exceed an available amount of buffering to automatically select the proxy path for association with these one or more network flows; and
   automatically communicating the network traffic from the one or more network flows on the network to the endpoint over the selected one of the proxy data path or the standard data path until the one or more network flows is terminated.

2. The method of claim 1, further comprising, when the amount of buffered network traffic exceeds a defined buffer size limit, moving the one or more network flows to the standard data path.

3. The method of claim 1, wherein the one or more proxy policy rules, further comprises:
   generating another network flow from the TMD to another endpoint; and
   communicating the network traffic from the network flow to the other endpoint over the other network flow.

4. The method of claim 1, wherein the one or more standard policy rules, further comprise, one or more of bandwidth monitoring, usage monitoring, firewall rules, bump-on-the-wire compression, bump-on-the-wire decompression, or bump-on-the-wire cryptographic operations.

5. The method of claim 1, wherein determining the one or more network policies, further comprises, determining the one network policies based at least in part on information for one or more subscribers, wherein the one or more subscribers are associated with the one or more network flows.

6. The method of claim 1, further comprising, determining the selected one of the proxy data path or the standard data path based on a configuration value associated with the one or more network policies, wherein the configuration value at least indicates which of the selected one of the proxy data path or the standard data path to associate with the one or more network policies.

7. A network computer for managing communication over a network, comprising:
- a transceiver for communicating over the network;
- a memory for storing at least instructions;
- a processor device that is operative to execute instructions that enable operations, including:
  - buffering network traffic from one or more network flows on the TMD, wherein the TMD includes a proxy data path and a standard data path for communicating the network traffic to an endpoint, wherein an amount of the buffering is in part based on one or more types of the network traffic;
  - determining one or more network policies that is associated with the one or more network flows based on a portion or more of the buffered data;
  - employing the one or more network policies that include one or more proxy policy rules associated with a subscriber to select the proxy data path for association with those network flows associated with the subscriber;
  - employing the one or more network policies that include just one or more standard policy rules to automatically select the standard data path for the one or more network flows that are unassociated with the subscriber;
  - employing the one or more network policies that include policy rules for the one or more network flows that are unassociated with the subscriber and exceed an available amount of buffering to automatically select the proxy path for association with these one or more network flows; and
  - automatically communicating the network traffic from the one or more network flows on the network to the endpoint over the selected one of the proxy data path or the standard data path until the one or more network flows is terminated.

8. The network computer of claim 7, wherein the network computer processor device is operative to enable actions, further comprising, when the amount of buffered network traffic exceeds a defined buffer size limit, moving the one or more network flows to the standard data path.

9. The network computer of claim 7, wherein the one or more proxy policy rules, further comprises:
- generating another network flow from the network computer to another endpoint; and
- communicating the network traffic from the network flow to the other endpoint over the other network flow.

10. The network computer of claim 7, wherein the one or more standard policy rules, further comprise, one or more of bandwidth monitoring, usage monitoring, firewall rules, bump-on-the-wire compression, bump-on-the-wire decompression, or bump-on-the-wire cryptographic operations.

11. The network computer of claim 7, wherein determining the one or more network policies, further comprises, determining the one or more network policies based in part or more on information for one or more subscribers, wherein the one or more subscribers are associated with the one or more network flows.

12. The network computer of claim 7, wherein the network computer processor device is operative to enable actions, further comprising, determining the selected one of the proxy data path or the standard data path based on a configuration value associated with the one or more network policies, wherein the configuration value indicates which of the selected one of the proxy data path or the standard data path to associate with the one or more network policies.

13. A processor readable non-transitive storage media that includes instructions for managing communication over a network, wherein a network computer that executes at least a portion of the instructions enables operations, comprising:
- buffering network traffic from one or more network flows on the TMD, wherein the TMD includes a proxy data path and a standard data path for communicating the network traffic to an endpoint, wherein an amount of the buffering is in part based on one or more types of the network traffic;
- determining one or more network policies that is associated with the one or more network flows based on a portion or more of the buffered data;
- employing the one or more network policies that include one or more proxy policy rules associated with a subscriber to select the proxy data path for association with those network flows associated with the subscriber;
- employing the one or more network policies that include just one or more standard policy rules to automatically select the standard data path for the one or more network flows that are unassociated with the subscriber;
- employing the one or more network policies that include policy rules for the one or more network flows that are unassociated with the subscriber and exceed an available amount of buffering to automatically select the proxy path for association with these one or more network flows; and
- automatically communicating the network traffic from the one or more network flows on the network to the endpoint over the selected one of the proxy data path or the standard data path until the one or more network flows is terminated.

14. The processor readable non-transitive storage media of claim 13, further comprising, when the amount of buffered network traffic exceeds a defined buffer size limit, moving the one or more network flows to the standard data path.

15. The processor readable non-transitive storage media of claim 13, wherein the one or more proxy policy rules, further comprises:
- generating another network flow from the network computer to another endpoint; and
- communicating the network traffic from the network flow to the other endpoint over the other network flow.

16. The processor readable non-transitive storage media of claim 13, wherein the one or more standard policy rules, further comprise, one or more of bandwidth monitoring, usage monitoring, firewall rules, bump-on-the-wire compression, bump-on-the-wire decompression, or bump-on-the-wire cryptographic operations.

17. The processor readable non-transitive storage media of claim 13, wherein determining the one or more network policies, further comprises, determining the one or more network policies based in part on information for one or more subscribers, wherein the one or more subscribers are associated with the one or more network flows.

18. The processor readable non-transitive storage media of claim 13, further comprising, determining the selected one of the proxy data path or the standard data path based on a configuration value associated with the one or more network policies, wherein the configuration value indicates which of the selected one of the proxy data path or the standard data path to associate with the one or more network policies.

19. A system arranged for managing communication over a network, comprising:
  a network computer, including:
    a transceiver for communicating over the network;
    a memory for storing at least instructions;
    a processor device that is operative to execute instructions that enable operations, including:
      buffering network traffic from one or more network flows on the TMD, wherein the TMD includes a proxy data path and a standard data path for communicating the network traffic to an endpoint, wherein an amount of the buffering is in part based on one or more types of the network traffic;
      determining one or more network policies that is associated with the one or more network flows based on a portion or more of the buffered data;
      employing the one or more network policies that include one or more proxy policy rules associated with a subscriber to select the proxy data path for association with those network flows associated with the subscriber;
      employing the one or more network policies that include just one or more standard policy rules to automatically select the standard data path for the one or more network flows that are unassociated with the subscriber;
      employing the one or more network policies that include policy rules for the one or more network flows that are unassociated with the subscriber and exceed an available amount of buffering to automatically select the proxy path for association with these one or more network flows; and
      automatically communicating the network traffic from the one or more network flows on the network to the endpoint over the selected one of the proxy data path or the standard data path until the one or more network flows is terminated; and
  a client computer, comprising:
    a transceiver for communicating over the network;
    a memory for storing at least instructions;
    a processor device that is operative to execute instructions that enable operations, including:
      providing network traffic from the one or more network flows to the network computer.

20. The system of claim 19, wherein the network computer processor device is operative to enable actions, further comprising, when the amount of buffered network traffic exceeds a defined buffer size limit, moving the one or more network flows to the standard data path.

21. The system of claim 19, wherein the one or more proxy policy rules, further comprises:
  generating another network flow from the network computer to another endpoint; and
  communicating the network traffic from the network flow to the other endpoint over the other network flow.

22. The system of claim 19, wherein the one or more standard policy rules, further comprise, one or more of bandwidth monitoring, usage monitoring, firewall rules, bump-on-the-wire compression, bump-on-the-wire decompression, or bump-on-the-wire cryptographic operations.

23. The system of claim 19, wherein determining the one or more network policies, further comprises, determining the one or more network policies based in part on information for one or more subscribers, wherein the one or more subscribers are associated with the one or more network flows.

24. The system of claim 19, wherein the network computer processor device is operative to enable actions, further comprising, determining the selected one of the proxy data path or the standard data path based on a configuration value associated with the one or more network policies, wherein the configuration value indicates which of the selected one of the proxy data path or the standard data path to associate with the one or more network policies.

* * * * *

UNITED STATES PATENT AND TRADEMARK OFFICE
CERTIFICATE OF CORRECTION

PATENT NO. : 9,866,489 B2
APPLICATION NO. : 14/329743
DATED : January 9, 2018
INVENTOR(S) : Dosovitsky et al.

It is certified that error appears in the above-identified patent and that said Letters Patent is hereby corrected as shown below:

In the Specification

In Column 1, Line 24, delete "with, efficiently" and insert -- with efficiently --, therefor.

In Column 1, Line 39, delete "wherein;" and insert -- wherein: --, therefor.

In Column 1, Line 50, delete "schematic" and insert -- schematic view --, therefor.

In Column 2, Lines 18-19, delete "in one of die" and insert -- "In one of the --, therefor.

In Column 2, Line 33, delete "air" and insert -- "an," --, therefor.

In Column 2, Line 57, delete "network flow." and insert -- "network flow," --, therefor.

In Column 2, Line 58, delete "flow,", "flow" and insert -- flow," "flow" --, therefor.

In Column 3, Line 11, delete "represent of one" and insert -- represent one --, therefor.

In Column 3, Line 40, delete "enabled enforce" and insert -- enabled to enforce --, therefor.

In Column 3, Line 49, delete "executed, in at least" and insert -- executed. In at least --, therefor.

In Column 3, Line 54, delete "arranged perform" and insert -- arranged to perform --, therefor.

In Column 4, Line 12, delete "proxying seep" and insert -- proxying step --, therefor.

In Column 4, Line 26, delete "iron-proxying" and insert -- non-proxying --, therefor.

In Column 4, Line 55, delete "according the policies for tire" and insert -- according to the policies for the --, therefor.

Signed and Sealed this
Twenty-first Day of April, 2020

Andrei Iancu
*Director of the United States Patent and Trademark Office*

In Column 5, Line 21, delete "thereof in" and insert -- thereof. In --, therefor.

In Column 5, Line 54, delete "network, flow for a connection the" and insert -- network flow for a connection through the --, therefor.

In Column 6, Line 7, delete "Also, In at" and insert -- Also, in at --, therefor.

In Column 7, Lines 66-67, delete "4th (4G) 5$^{th}$ (5G)" and insert -- 4th (4G), 5th (5G) --, therefor.

In Column 8, Line 7, delete "Mobil" and insert -- Mobile --, therefor.

In Column 8, Line 9, delete "Enhanced Data GSM Environment" and insert -- Enhanced data rates for GSM evolution --, therefor.

In Column 8, Line 42, delete "hunt," and insert -- limit, --, therefor.

In Column 8, Line 45, delete "could, be" and insert -- could be --, therefor.

In Column 8, Line 46, delete "modem," and insert -- modem --, therefor.

In Column 8, Line 58, delete "EE," and insert -- RF, --, therefor.

In Column 9, Line 23, delete "data, flow" and insert -- data flow --, therefor.

In Column 10, Line 7, delete "interlace" and insert -- interface --, therefor.

In Column 10, Line 28, delete "worldwide" and insert -- Worldwide --, therefor.

In Column 11, Line 43, delete "component," and insert -- component --, therefor.

In Column 11, Line 44, delete "network computer 200," and insert -- client computer 200, --, therefor.

In Column 11, Line 52, delete "other data," and insert -- other data. --, therefor.

In Column 12, Line 3, delete "("TM")," and insert -- ("IM"), --, therefor.

In Column 12, Line 6, delete "browser 218," and insert -- browser 218. --, therefor.

In Column 12, Line 29, delete "shown, Use" and insert -- shown. The --, therefor.

In Column 12, Line 46, delete "employed, Basic" and insert -- employed. Basic --, therefor.

In Column 12, Line 48, delete "fire" and insert -- the --, therefor.

In Column 12, Line 49, delete "300, As" and insert -- 300. As --, therefor.

CERTIFICATE OF CORRECTION (continued)
U.S. Pat. No. 9,866,489 B2

In Column 12, Line 53, delete "protocol" and insert -- protocol. --, therefor.

In Column 12, Line 65, delete "device 328," and insert -- device 328. --, therefor.

In Column 13, Line 4, delete "ROM." and insert -- ROM, --, therefor.

In Column 13, Line 19, delete "data, storage" and insert -- data storage --, therefor.

In Column 13, Line 28, delete "info" and insert -- into --, therefor.

In Column 13, Line 31, delete "word, processing programs." and insert -- word processing programs, --, therefor.

In Column 13, Line 33, delete "interface programs." and insert -- interface programs, --, therefor.

In Column 13, Line 34, delete "security programs." and insert -- security programs, --, therefor.

In Column 13, Line 36, delete "forth," and insert -- forth. --, therefor.

In Column 14, Line 6, delete "embodiments." and insert -- embodiments, --, therefor.

In Column 14, Line 34, delete "segments, in" and insert -- segments. In --, therefor.

In Column 14, Line 51, delete "one embodiments," and insert -- one embodiment, --, therefor.

In Column 14, Line 67, delete "CS 318," and insert -- CS 318. --, therefor.

In Column 15, Line 35, delete "between, client" and insert -- between client --, therefor.

In Column 15, Line 53, delete "embodiments." and insert -- embodiments, --, therefor.

In Column 16, Line 49, delete "embodiments." and insert -- embodiments, --, therefor.

In Column 16, Line 50, delete "DFS 406," and insert -- DFS 406. --, therefor.

In Column 16, Line 56, delete "computers," and insert -- computers. --, therefor.

In Column 17, Line 47, delete "schematic" and insert -- schematic view --, therefor.

In Column 18, Line 27, delete "datapath" and insert -- data path --, therefor.

In Column 19, Line 8, delete "feast" and insert -- least --, therefor.

In Column 19, Line 27, delete "butter" and insert -- buffer --, therefor.

In Column 19, Line 42, delete "assigned," and insert -- assigned --, therefor.

CERTIFICATE OF CORRECTION (continued)
U.S. Pat. No. 9,866,489 B2

In Column 19, Line 66, delete "Ore" and insert -- the --, therefor.

In Column 20, Line 20, delete "than," and insert -- than --, therefor.

In Column 21, Line 1, delete "buttered" and insert -- buffered --, therefor.

In Column 21, Line 4, delete "tip." and insert -- up. --, therefor.

In Column 22, Line 4, delete "terminate" and insert -- terminate and --, therefor.

In Column 22, Line 35, delete "PTMD, Since" and insert -- PTMD. Since --, therefor.

In Column 22, Line 51, delete "associated the" and insert -- associated with the --, therefor.

In Column 22, Line 57, delete "known the" and insert -- known to the --, therefor.

In Column 22, Line 63, delete "Set vice (RADIUS)" and insert -- Service (RADIUS) --, therefor.

In Column 22, Line 66, delete "souse" and insert -- some --, therefor.

In Column 23, Line 12, delete "fit" and insert -- at --, therefor.

In Column 23, Line 23, delete "embodiments. If" and insert -- embodiments, if --, therefor.

In Column 23, Line 46, delete "back block" and insert -- back to block --, therefor.